United States Patent
Mikasa

(10) Patent No.: US 10,442,321 B2
(45) Date of Patent: Oct. 15, 2019

(54) CLUTCH UNIT FOR VEHICLE

(71) Applicant: SHIROKI CORPORATION, Fujisawa-shi (JP)

(72) Inventor: Kunihiro Mikasa, Fujisawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 143 days.

(21) Appl. No.: 15/713,793

(22) Filed: Sep. 25, 2017

(65) Prior Publication Data
US 2018/0099585 A1    Apr. 12, 2018

(30) Foreign Application Priority Data
Oct. 7, 2016 (JP) .................................. 2016-198860

(51) Int. Cl.
| | |
|---|---|
| *F16D 41/067* | (2006.01) |
| *B60N 2/16* | (2006.01) |
| *F16D 15/00* | (2006.01) |
| *F16D 41/08* | (2006.01) |
| *B60N 2/90* | (2018.01) |

(52) U.S. Cl.
CPC .............. *B60N 2/16* (2013.01); *B60N 2/165* (2013.01); *B60N 2/167* (2013.01); *B60N 2/1615* (2013.01); *B60N 2/943* (2018.02); *F16D 15/00* (2013.01); *F16D 41/067* (2013.01); *F16D 41/08* (2013.01)

(58) Field of Classification Search
CPC .......... B60N 2/16; B60N 2/165; B60N 2/167; B60N 2/168; F16D 41/064; F16D 41/066; F16D 41/067; F16D 2041/0665
See application file for complete search history.

(56) References Cited

U.S. PATENT DOCUMENTS

| | | | | |
|---|---|---|---|---|
| 3,247,727 A | * | 4/1966 | Digby ..................... | F02N 15/02 192/45.018 |
| 3,581,597 A | * | 6/1971 | Reiersgaard .......... | F16D 41/105 192/44 |
| 5,145,042 A | * | 9/1992 | MacPherson ......... | F16D 41/088 192/44 |
| 6,481,557 B2 | * | 11/2002 | Denis ..................... | B60N 2/167 192/15 |

(Continued)

FOREIGN PATENT DOCUMENTS

JP    2006-090344 A    4/2006

*Primary Examiner* — David R Morris
(74) *Attorney, Agent, or Firm* — McGinn I.P. Law Group, PLLC.

(57) ABSTRACT

A clutch unit includes: an input-side transmission member provided to move from an initial position toward a tip of the wedge-shaped space, and an inside tangential line is a tangential line at a contact point of the input-side transmission member and the input-side inner ring member, an outside tangential line is a tangential line at a contact point of the input-side transmission member and the input-side outer ring member, and a segment connects a rotational center of the input-side transmission member with an intersection point between the inside tangential line and the outside tangential line, wherein a wedge angle is an acute angle defined by the segment and the inside tangential line, and a stopper projection is provided at a tip-side position, and a wedge angle formed by the stopper projection is larger than an initial wedge angle at the initial position.

8 Claims, 15 Drawing Sheets

(56) References Cited

U.S. PATENT DOCUMENTS

| | | | | |
|---|---|---|---|---|
| 6,640,952 B2* | 11/2003 | Baloche | ................ | B60N 2/167 |
| | | | | 192/223.2 |
| 6,641,215 B2* | 11/2003 | Rohee | ................ | B60N 2/167 |
| | | | | 297/344.12 |
| 6,971,719 B2* | 12/2005 | Liu | ................ | B60N 2/6671 |
| | | | | 192/223.2 |
| 2002/0043849 A1* | 4/2002 | Denis | ................ | B60N 2/167 |
| | | | | 297/344.1 |
| 2002/0195859 A1* | 12/2002 | Rohee | ................ | B60B 2/167 |
| | | | | 297/367 R |
| 2003/0001418 A1* | 1/2003 | Baloche | ................ | B60N 2/167 |
| | | | | 297/344.12 |
| 2004/0183349 A1* | 9/2004 | Liu | ................ | B60N 2/6671 |
| | | | | 297/284.4 |
| 2018/0345826 A1* | 12/2018 | Mikasa | ................ | B60N 2/1615 |

* cited by examiner

CLUTCH UNIT FOR VEHICLE

CROSS-REFERENCE TO RELATED APPLICATION

This application claims priority from Japanese Patent Application No. 2016-198860 filed on Oct. 7, 2016 the entire subject matter of which is incorporated herein by reference.

TECHNICAL FIELD

This disclosure relates to a clutch unit for a vehicle.

BACKGROUND

There is known a clutch unit for vehicle, hereinafter also referred as vehicle clutch unit, of JP-A-2006-290344.

The vehicle clutch unit has an input-side clutch which includes an inner ring having a cam surface on an outer circumferential surface, an outer ring having a bottomed cylindrical shape, and a roller provided in a wedge-shaped space formed between the inner ring and the outer ring. A torque input to the input-side clutch is transmitted to the inner ring, and the torque transmitted to the inner ring is transmitted to the outer ring through the roller.

SUMMARY

In the vehicle clutch unit of JP-A-2006-290344, when an excessive torque is input to the input-side clutch, the roller applies a large force to the outer ring. Thus, there is a concern that the outer ring is plastically deformed such that the roller expands the wedge-shaped space.

In this regard, an object of this disclosure is to provide a vehicle clutch unit in which an input-side outer ring member or an input-side inner ring member is hardly deformed plastically even when an excessive torque is input to the input-side clutch.

According to this disclosure, a clutch unit used in a vehicle seat includes: an operation lever, which is rotatable about a rotational axis line; an output shaft member, which is rotatable about the rotational axis line and outputs an operating force that is input to the operation lever in the vehicle seat; and an input-side clutch including: an input-side inner ring member and an input-side outer ring member, which are provided coaxially with the rotational axis line and in which the output shaft member is inserted; and an input-side transmission member, which is arranged in a wedge-shaped space formed between an outer circumferential surface of the input-side inner ring member and an inner circumferential surface of the input-side outer ring member, wherein the input-side clutch transmits, through the input-side transmission member, a rotation of the operation lever to the output shaft member in such a manner that one member of the input-side inner ring member and the input-side outer ring member rotates according to the rotation of the operation lever to rotate the other member of the input-side inner ring member and the input-side outer ring member, wherein the input-side transmission member is provided to move from an initial position toward a tip of the wedge-shaped space when an operation torque input to the operation lever is equal to or more than a predetermined torque, wherein as viewed in the rotational axis line direction, an inside tangential line is a tangential line at a contact point of the input-side transmission member and the input-side inner ring member, an outside tangential line is a tangential line at a contact point of the input-side transmission member and the input-side outer ring member, and a segment connects a rotational center of the input-side transmission member with an intersection point between the inside tangential line and the outside tangential line, wherein a wedge angle is an acute angle defined by the segment and the inside tangential line, and wherein a stopper projection is provided at a tip-side position of the wedge-shaped space from the initial position, in at least one of the outer circumferential surface of the input-side inner ring member and the inner circumferential surface of the input-side outer ring member, and a wedge angle formed by the stopper projection is larger than an initial wedge angle at the initial position.

In the clutch unit for the vehicle according to this disclosure, the stopper projection is provided in a position in which the input-side transmission member moves when an excessive torque is input to the operation lever. Accordingly, when the excessive torque is input, the input-side transmission member abuts on the stopper projection, so that the wedge angle becomes large. For this reason, the frictional engagement of the input-side outer ring member and the input-side inner ring member of the input-side transmission member is released, and the torque is hardly transmitted from the input-side inner ring member to the input-side outer ring member, whereby the input-side outer ring member is hardly deformed plastically. Incidentally, even in a case where the torque input to the operation lever is transmitted from the input-side outer ring member to the input-side inner ring member, the stopper projection can suppress the plastic deformation of the input-side inner ring member.

In the above clutch unit, the stopper projection is provided in one of the input-side inner ring member and the input-side outer ring member, and a hardness of the input-side transmission member, a hardness of one of the input-side inner ring member and the input-side outer ring member provided with the stopper projection, and a hardness of the other of the input-side inner ring member and the input-side outer ring member not provided with the stopper projection are smaller in such an order.

In the clutch unit according to this disclosure, the stopper projection is hardly deformed, and the plastic deformation of the input-side outer ring member or the input-side inner ring member is easily suppressed by the stopper projection.

In this disclosure, the clutch unit is provided in which the input-side outer ring member or the input-side inner ring member is hardly deformed plastically even in a case where the excessive torque is input to the input-side clutch.

BRIEF DESCRIPTION OF THE DRAWINGS

The foregoing and additional features and characteristics of this disclosure will become more apparent from the following detailed descriptions considered with the reference to the accompanying drawings, wherein:

FIGS. 5A and 5B are views for explaining an internal operation of the vehicle clutch unit, wherein FIG. 5A is a sectional view taken along line B-B in FIG. 3, and FIG. 5B is a sectional view taken along line C-C in FIG. 3;

FIGS. 6A and 6B are views for explaining the internal operation of the vehicle clutch unit, wherein FIG. 6A is a sectional view taken along the line B-B in FIG. 3, and FIG. 6B is a sectional view taken along the line C-C in FIG. 3;

FIGS. 7A and 7B are views for explaining the internal operation of the vehicle clutch unit, wherein FIG. 7A is a sectional view taken along the line B-B in FIG. 3, and FIG. 7B is a sectional view taken along the line C-C in FIG. 3;

FIGS. 8A and 8B are views for explaining the internal operation of the vehicle clutch unit, wherein FIG. 8A is a sectional view taken along the line B-B in FIG. 3, and FIG. 8B is a sectional view taken along the line C-C in FIG. 3;

FIGS. 9A and 9B are views for explaining the internal operation of the vehicle clutch unit, wherein FIG. 9A is a sectional view taken along the line B-B in FIG. 3, and FIG. 9B is a sectional view taken along the line C-C in FIG. 3;

FIGS. 10A and 10B are views for explaining an internal operation of a vehicle clutch unit according to a reference example, wherein FIG. 10A is a sectional view taken along the line B-B in FIG. 3, and FIG. 10B is a sectional view taken along the line C-C in FIG. 3;

FIGS. 11A and 11B are views for explaining the internal operation of the vehicle clutch unit according to the reference example, wherein FIG. 1A is a sectional view taken along the line B-B in FIG. 3, and FIG. 11B is a sectional view taken along the line C-C in FIG. 3;

DETAILED DESCRIPTION

Hereinafter, an embodiment of a vehicle clutch unit according to this disclosure will be described with reference to the drawings.

Figure 1:
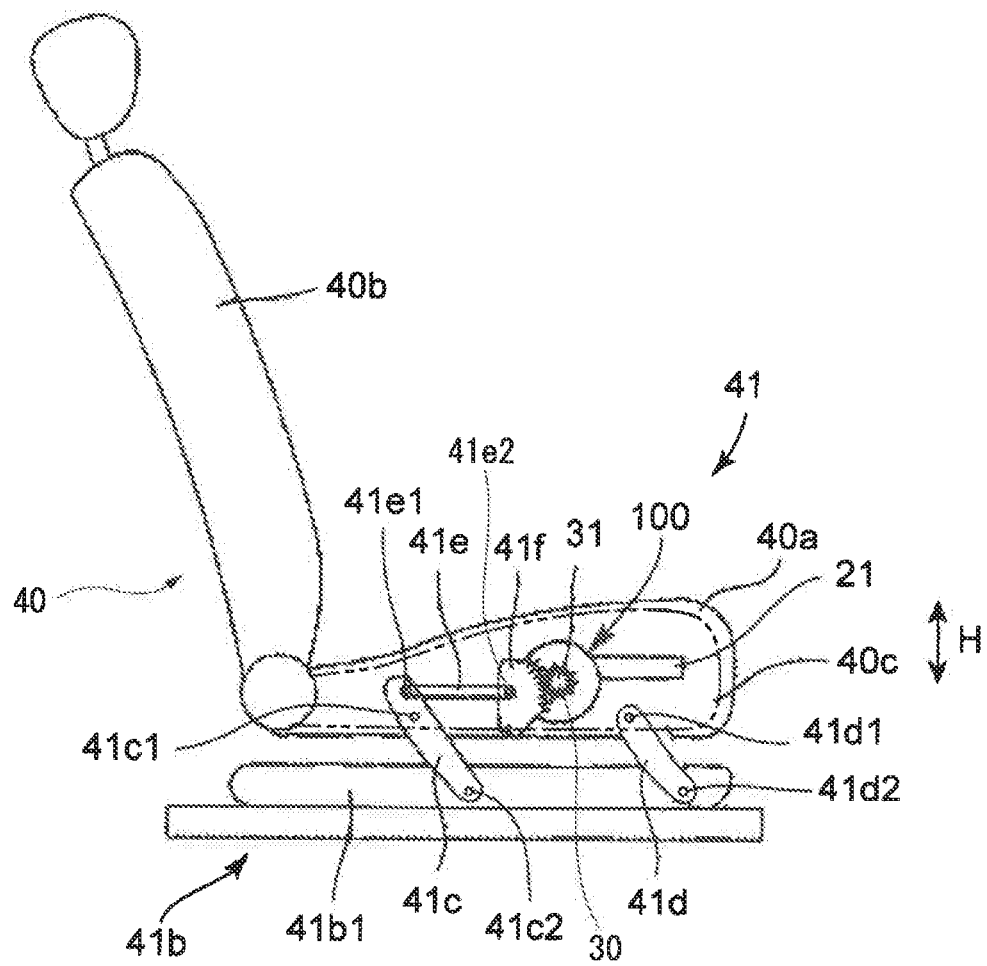
FIG. 1 is a side view illustrating a state where a vehicle clutch unit according to an embodiment is applied to a vehicle seat lifter.

FIG. 1 is a side view illustrating a state where a vehicle clutch unit according to the embodiment is applied to a vehicle seat lifter. As illustrated in FIG. 1, a vehicle clutch unit 100 according to the embodiment is used in a vehicle seat 40. The vehicle seat 40 has a sitting seat 40a, a back rest 40b, and a seat frame 40c. The vehicle clutch unit 100 is fixed in the seat frame 40c of the sitting seat 40a. A vehicle seat lifter 41 is mounted in the vehicle seat 40. The vehicle seat lifter 41 includes the vehicle clutch unit 100.

The vehicle seat lifter 41 includes a sector gear 41f and a link mechanism. The vehicle clutch unit 100 includes an operation lever 21 which is rotated positively and reversely. A pinion gear 31 integrated with an output shaft member 30 which is rotationally driven positively and reversely by the operation lever 21 is meshed with the sector gear 41f of the vehicle seat lifter 41.

The link mechanism includes a first link member 41c which extends nearly vertically, a second link member 41d which extends nearly vertically, and a third link member 41e which extends nearly laterally.

The upper portion of the first link member 41c and the upper portion of the second link member 41d are connected in the seat frame 40c to be rotatable by respective shaft members 41c1 and 41d1. The lower portion of the first link member 41c and the lower portion of the second link member 41d are connected in a slidable member 41b1 of a seat slide adjuster 41b to be rotatable by respective shaft members 41c2 and 41d2.

One end of the third link member 41e is connected with the first link member 41c by a shaft member 41e1 above the shaft member 41c1. The other end of the third link member 41e is rotatably connected with the sector gear 41f in the shaft member 41e2.

As illustrated in FIG. 1, when the operation lever 21 is rotated in a counterclockwise direction (upward), the input torque (rotation force) of the rotation direction is transmitted to the pinion gear 31 through the clutch unit 100, and the pinion gear 31 rotates in the counterclockwise direction. Thus, the sector gear 41f which is meshed with the pinion gear 31 rotates in the clockwise direction, and the third link member 41e pulls the upper portion of the first link member 41c upward. As a result, the first link member 41c and the second link member 41d are erected together, and the sitting surface of the sitting seat 40a becomes higher.

In this manner, when an operator adjusts the height H of the sitting seat 40a and then the force input to the operation lever 21 is released, the operation lever 21 rotates in the clockwise direction and returns to an original position (in following description, referred to as a neutral position or a neutral state).

In addition, in a case where the operation lever 21 is rotated in the clockwise direction (downward), the sitting surface of the sitting seat 40a becomes lower by a reverse operation of the above-described operation. In addition, when the operation lever 21 is released after the height adjustment, the operation lever 21 rotates in the counterclockwise direction and returns to the original position (neutral position, neutral state).

Further, in a state where the operation lever 21 is released, the vehicle clutch unit 100 applies a brake to the rotation of the output shaft member 30 (pinion gear 31), and the corresponding movement is inhibited even when the vertical force is applied to the sitting seat 40a.

Vehicle Clutch Unit

Next, the description will be given about the vehicle clutch unit 100 according to the embodiment. The components (to be described) of the clutch unit 100 are basically made of metal unless otherwise specified.

Figure 2:
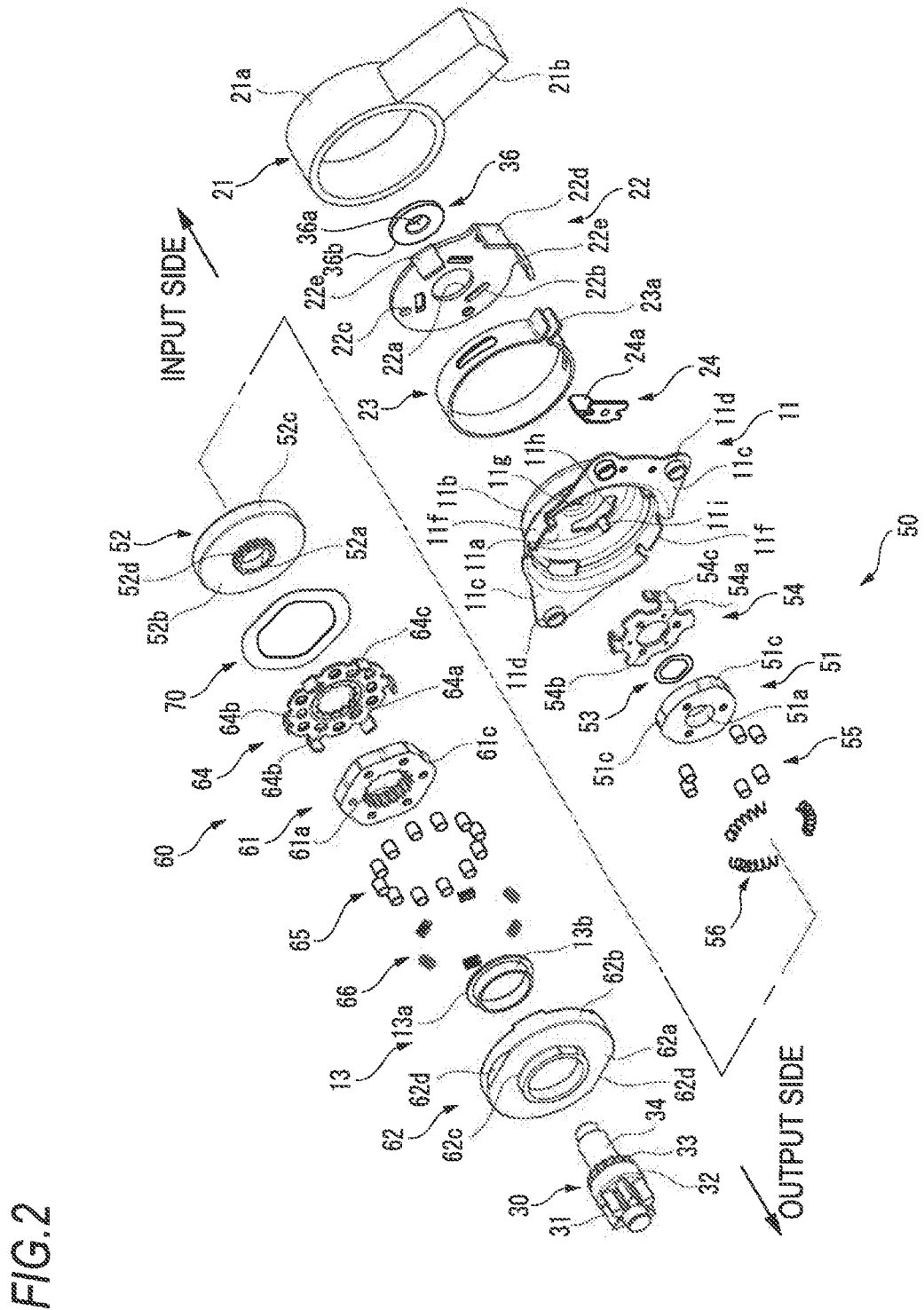
FIG. 2 is an exploded perspective view illustrating the vehicle clutch unit according to the embodiment.
Figure 3:
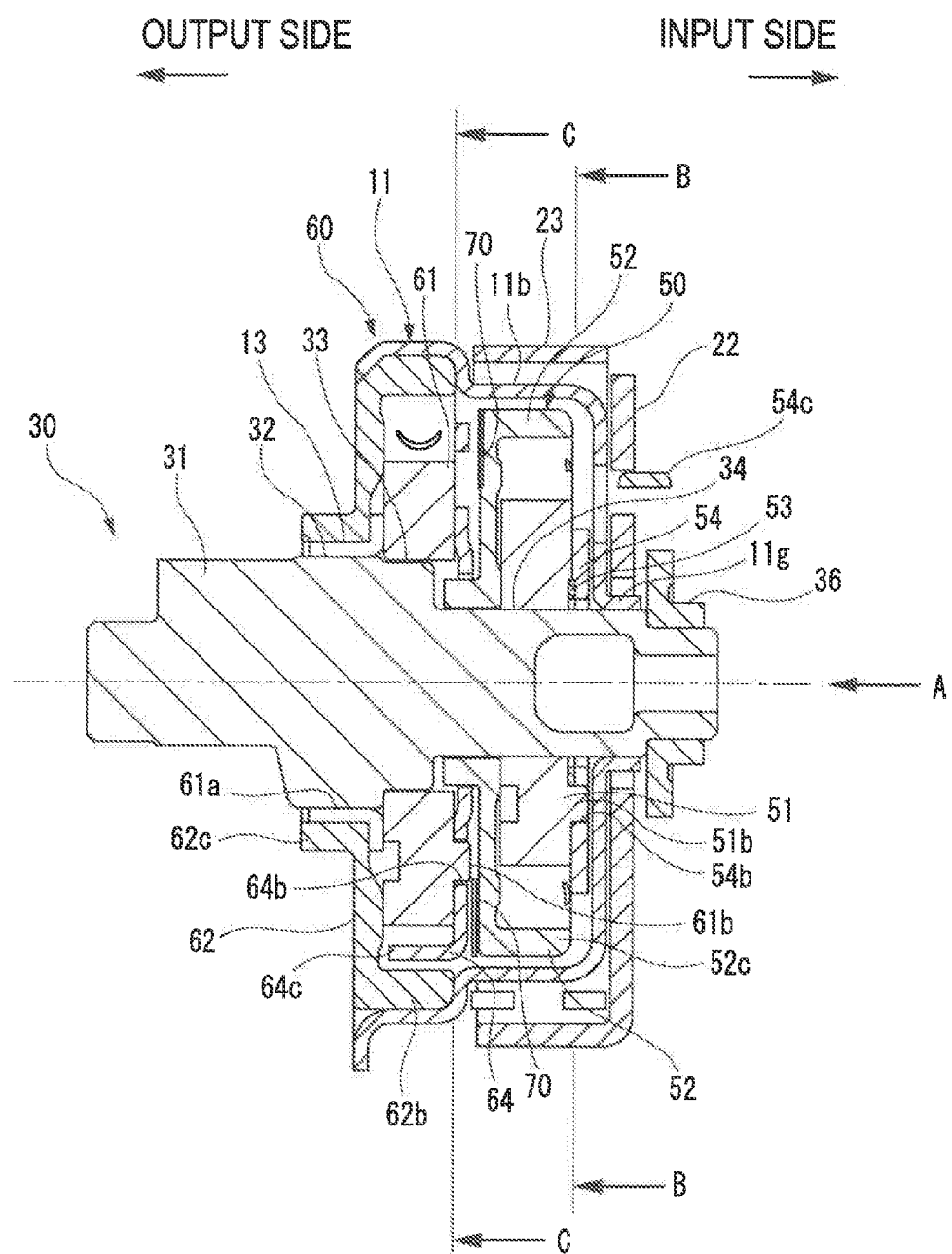
FIG. 3 is a sectional view taken along an axial direction of the vehicle clutch unit according to the embodiment.

FIG. 2 is an exploded perspective view illustrating the vehicle clutch unit 100. FIG. 3 is a sectional view taken along the axial direction of the vehicle clutch unit 100.

As illustrated in FIGS. 2 and 3, the vehicle clutch unit 100 includes the operation lever 21, the output shaft member 30, an input-side clutch 50, an output-side clutch 60, and a housing 11.

The input-side clutch 50 is driven (operated) by the operation lever 21, and the rotation of the operation lever 21 is transmitted to the output shaft member 30. The output-side clutch 60 inhibits the rotation of the output shaft member 30 even when the vertical force is applied to the sitting seat 40a. The input-side clutch 50 and the output-side clutch 60 are housed in the housing 11.

The output shaft member 30 is a shaft member which extends in a right and left direction in FIG. 3. In following description, the "axial direction" indicates an extending direction of the output shaft member 30. As illustrated in FIG. 3, from the left side to the right side in FIG. 3, the output shaft member 30 penetrates the output-side clutch 60 and the input-side clutch 50 in such an order. In following description, the left side in FIG. 3 is referred to as an output side in the axial direction, and the right side in FIG. 3 is referred to as an input side in the axial direction. The pinion gear 31 is provided in the output-side end of the output shaft member 30 in the axial direction.

In the output shaft member 30, the pinion gear 31, a large-diameter cylindrical part 32, a spline part 33, and a small-diameter cylindrical part 34 are provided in such an order from the output side in the axial direction toward the input side.

The large-diameter cylindrical part 32 is rotatably supported by a metal bush 13 fixed in an output-side outer ring member 62 of the output-side clutch 60 (to be described). The small-diameter cylindrical part 34 is rotatably supported by an input-side inner ring member 51 and an input-side outer ring member 52 of the input-side clutch 50 and the housing 11 (to be described). A plurality of groove parts are formed in the outer circumferential surface of the spline part 33. The spline part 33 is spline-coupled to an output-side inner ring member 61 of the output-side clutch 60 (to be described).

A stopper ring 36 is mounted in the small-diameter cylindrical part 34 of the output shaft member 30. The stopper ring 36 has a cylindrical fitting part 36a, and a disc-shaped flange part 36b which is positioned on the output side from the fitting part 36a in the axial direction. The small-diameter cylindrical part 34 of the output shaft member 30 is fitted into the fitting part 36a. The flange part 36b abuts on an operation plate 22 (to be described), and prevents the operation plate 22, the housing 11, the input-side clutch 50, and the output-side clutch 60 from getting out of the output shaft member 30.

The housing 11 is a cup-shaped member and includes a bottom surface 11a and a cylindrical part 11b. Two fixing flanges 11c which protrude in the radial direction are formed in the end of the cylindrical part 11b on the output side from the bottom surface 11a in the axial direction. A fixing bolt insertion hole 11d is provided in the fixing flange 11c. When a bolt (not illustrated) which is inserted into the fixing bolt insertion hole 11d is screwed into a screw hole of the seat frame 40c, the housing 11 is fixed in the seat frame 40c. Otherwise, the housing 11 may be fixed in the seat frame 40c in such a manner that a caulking part is provided in the housing 11, and the caulking part is caulked in the seat frame 40c.

A spring lock part 24 having a spring lock piece 24a is fixed in one fixing flange 11c. The spring lock part 24 is fixed in the fixing flange 11c of the housing 11. The spring lock piece 24a extends along the cylindrical part 11b in the axial direction.

A cylindrical bearing 11g is formed in the central portion of the bottom surface 11a in the radial direction by a burring process. The bearing 11g extends from the bottom surface 11a toward the input side in the axial direction. Three window parts 11h which are formed by arc-shaped long holes and three protrusion pieces 11i which extends from the edge portion of the window part 11h toward the output side in the axial direction are formed in the bottom surface 11a.

The operation lever 21 is formed of a synthetic resin, for example, and has a fixing part 21a in which the operation plate 22 is fixed, and a rod-shaped grip part 21b which extends from the fixing part 21a to the outside in the radial direction. The operation lever 21 is fixed in the operation plate 22.

When the operator grips the grip part 21b of the operation lever 21 to rotate the operation lever 21 positively and reversely, the operation plate 22 rotates positively and reversely integrally with the operation lever 21. The operation plate 22 is provided between the housing 11 and the operation lever 21 in the axial direction. The operation plate 22 is fixed to the operation lever 21. The operation plate 22 is rotatably supported in the housing 11.

The operation plate 22 has an insertion hole 22a in the center of the radial direction. The small-diameter cylindrical part 34 of the output shaft member 30 is inserted into the insertion hole 22a. The operation plate 22 has three rectangular engaging holes 22b and a circular fixing hole 22c around the insertion hole 22a. When a screw (not illustrated) inserted into the fixing hole 22c is screwed to the operation lever 21, the operation plate 22 is fixed to the operation lever 21.

A pair of regulation piece parts 22e and an operation piece part 22d are provided in the outer circumferential edge of the operation plate 22. The operation piece part 22d is provided between the pair of regulation piece parts 22e. The pair of regulation piece parts 22e and the operation piece part 22d extend toward the output side in the axial direction.

A returning spring 23 is provided in the outer circumference of the housing 11. The returning spring 23 is a spring which makes the operation lever 21 (and the operation plate 22) return to the neutral position when an operating force is applied to the operation lever 21 (when the operating force is released). The returning spring 23 is a plate spring which is formed in an arc shape by bringing both free ends 23a close to each other. The spring lock piece 24a of the spring lock part 24 fixed in the housing 11 and the operation piece part 22d of the operation plate 22 are arranged between the both free ends 23a of the returning spring 23.

Figure 4A:
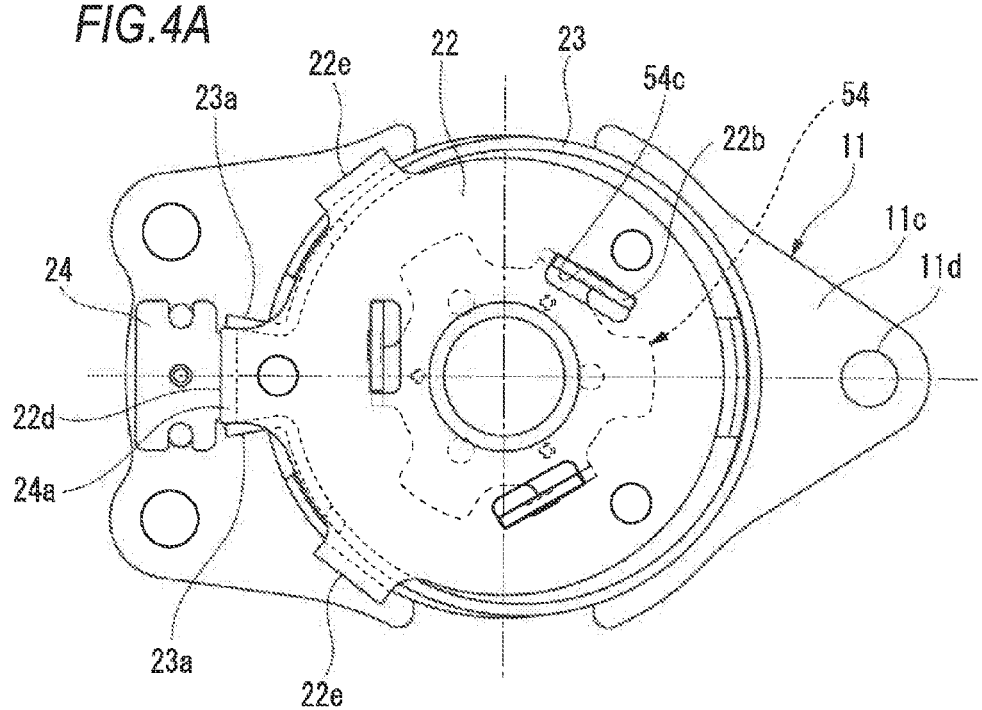
FIGS. 4A and 4B are views for explaining a movement of an operation plate, and are views as seen from a direction of an arrow A in FIG. 3.
Figure 4B:
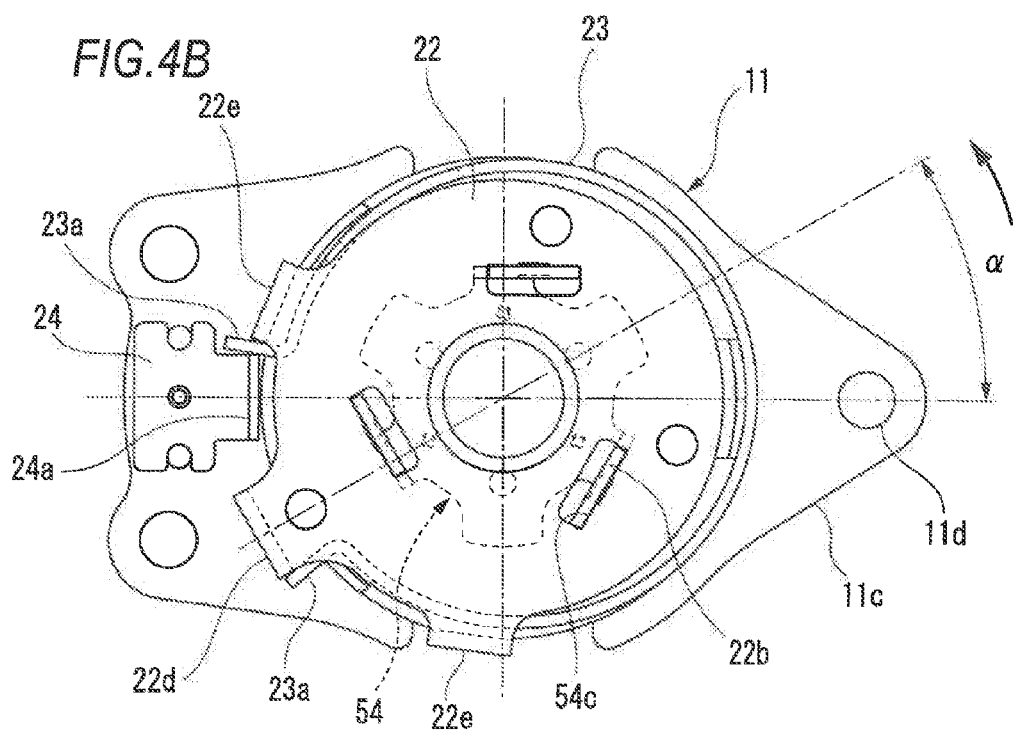

FIGS. 4A and 4B are views for explaining a movement of the operation plate 22. FIGS. 4A and 4B are views as seen from a direction of an arrow A in FIG. 3. FIG. 4A illustrates a neutral state, and FIG. 4B illustrates a driving state.

As illustrated in FIG. 4A, in a state where the operator does not apply the operating force to the operation lever 21 (neutral state), the operation lever 21 is supported at the neutral position in which the pair of free ends 23a of the returning spring 23 together abut on the spring lock piece 24a and the operation piece part 22d.

As illustrated in FIG. 4B, when the operator rotates the operation lever 21 either positively or reversely to be the driving state, the operation plate 22 rotates together with the operation lever 21 with respect to the housing 11. Thus, while one free end 23a of the pair of free ends 23a is maintained to be engaged with the spring lock piece 24a fixed in the housing 11, the other free end 23a is engaged with the operation piece part 22d of the operation plate 22 to move in a separating direction from the one free end 23a. Therefore, the returning spring 23 is bent to apply a returning force to the neutral position.

When a rotating amount of the operation lever 21 reaches a predetermined amount, the regulation piece parts 22e of the operation plate 22 abut on the other free end 23a which abuts on the spring lock piece 24a, and it is regulated that the operation lever 21 is rotated further.

Input-Side Clutch

Returning to FIGS. 2 and 3, the input-side clutch 50 includes the input-side inner ring member 51, the input-side outer ring member 52, a biasing member 53, an operation bracket (operation member) 54, an input-side clutch roller (input-side transmission member) 55, and an input-side roller biasing spring 56.

The input-side inner ring member 51 is a columnar member which extends in the axial direction. The input-side inner ring member 51 has an insertion hole 51a in which the small-diameter cylindrical part 34 of the output shaft member 30 is inserted to the center. Three protruding parts 51b are formed in the input-side surface of the input-side inner ring member 51 in the axial direction (see FIG. 3). Wedge cam parts 51c which swell outside are provided in three places of the outer circumferential edge of the input-side inner ring member 51 with a constant interval.

An operation bracket 54 is a plate-shaped member. The operation bracket 54 has an insertion hole 54a in which the small-diameter cylindrical part 34 of the output shaft member 30 is inserted into the center in the radial direction. The operation bracket 54 has three fitting holes 54b into which the protruding parts 51b of the input-side inner ring member 51 are fitted.

Three claw parts 54c are provided in the outer circumferential edge of the operation bracket 54. The claw parts 54c penetrate the window part 11h formed in the bottom surface 11a of the housing 11 and are fitted in the engaging holes 22b of the operation plate 22. Accordingly, the input-side inner ring member 51 is fixed in the operation plate 22 through the operation bracket 54.

The biasing member 53 is provided between the input-side inner ring member 51 and the operation bracket 54 in a rotational axis line direction. The biasing member 53 is provided on the input side of the input-side inner ring member 51 in the axial direction. The biasing member 53 is made of a wave washer obtained by forming a spring steel in a ring shape and the like, and has a waveform shape in which a plurality of curved portions are formed alternately along a circumferential direction.

The biasing member 53 makes a biasing force on the input-side inner ring member 51 and the operation bracket 54 to be separated from each other. In a state where the biasing force is applied by the biasing member 53, the protruding part 51b of the input-side inner ring member 51 is in the state of being inserted into the fitting hole 54b of the operation bracket 54. Accordingly, the input-side inner ring member 51 and the operation bracket 54 which are separate members are connected to be rotatable integrally with each other and to be movable relatively in the rotational axis line direction.

The input-side outer ring member 52 has a bottom part 52b, an outer ring part 52c, and a fixing part 52d. The bottom part 52b is a disc-shaped portion. An insertion hole 52a into which the small-diameter cylindrical part 34 of the output shaft member 30 is inserted is provided in the center of the bottom part 52b in the radial direction. The outer ring part 52c is a cylindrical portion which is formed in the outer edge portion of the bottom part 52b. The bottom part 52b is provided in the output-side end of the outer ring part 52c in the axial direction. The fixing part 52d protrudes from the outer edge of the insertion hole 52a to the output side in the axial direction. A spline groove is formed in the outer circumferential surface of the fixing part 52d. The fixing part 52d is spline-coupled to a release bracket 64 of the output-side clutch 60 (to be described).

Figure 5A:
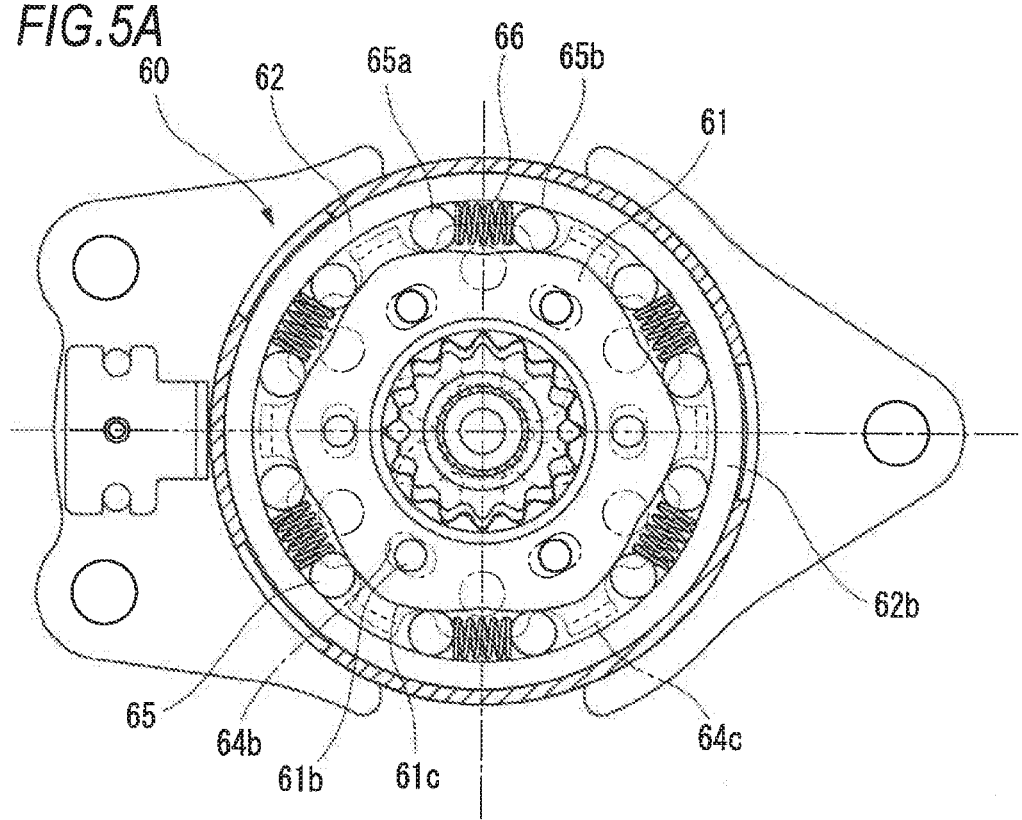
Figure 5B:
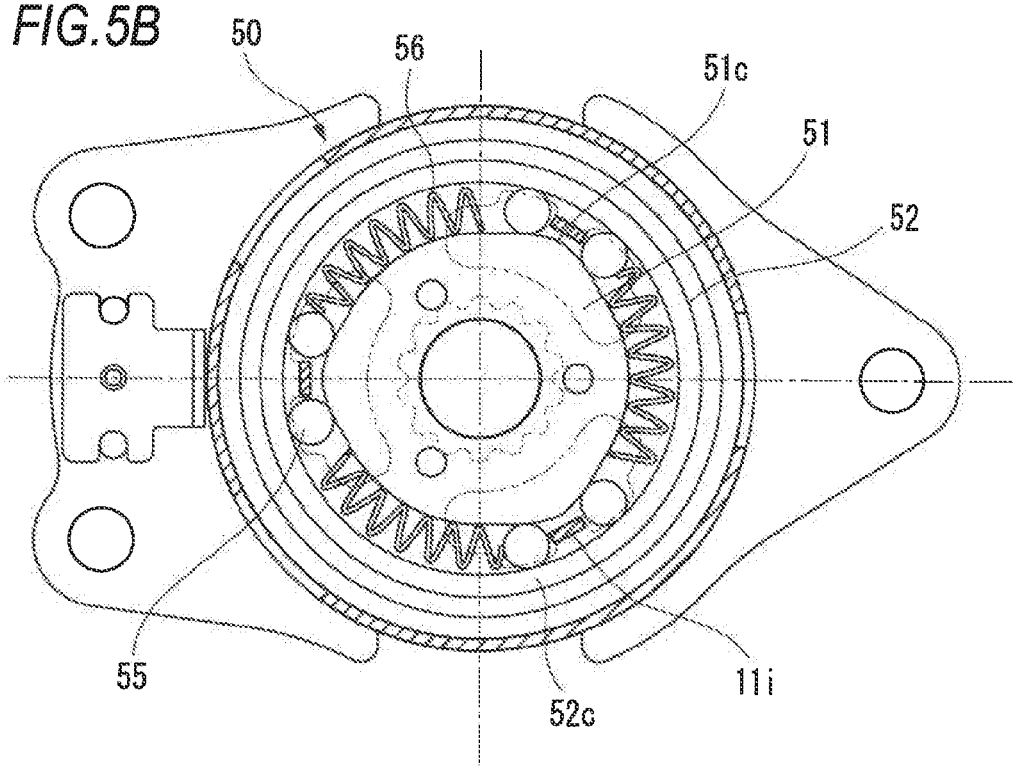

FIGS. 5A and 5B are views illustrating the vehicle clutch unit 100 in the neutral state illustrated in FIG. 4A. FIG. 5A is a sectional view taken along line B-B in FIG. 3, and illustrates the output-side clutch 60 in the neutral state. FIG. 5B is a sectional view taken along line C-C in FIG. 3, and illustrates the input-side clutch 50 in the neutral state.

As illustrated in FIG. 5B, a gap is provided between the inner circumferential surface of the input-side outer ring member 52 and the outer circumferential surface of the input-side inner ring member 51. While the inner circumferential surface of the input-side outer ring member 52 is a circumferential surface, three wedge cam parts 51c which swell outside are provided in the outer circumferential surface of the input-side inner ring member 51. For this reason, three portions of which both ends in the radial direction are tapered in a wedge shape are formed in the gap between the inner circumferential surface of the input-side outer ring member 52 and the outer circumferential surface of the input-side inner ring member 51. Three protrusion pieces 11i of the housing protrude in the gap. When the input-side inner ring member 51 is rotated by the operation lever 21, the protrusion piece 11i regulates the movement of the input-side clutch roller 55.

The input-side clutch 50 has six input-side clutch rollers 55 and three input-side roller biasing springs 56. The input-side clutch roller 55 and the input-side roller biasing spring 56 are arranged between the outer circumferential surface of the input-side inner ring member 51 and the inner circumferential surface of the outer ring part 52c of the input-side outer ring member 52.

The input-side roller biasing spring 56 is arranged between the wedge cam parts 51c of the input-side inner ring member 51 in the radial direction. In addition, a pair of input-side clutch rollers 55 are arranged on both sides of the wedge cam part 51c of the input-side inner ring member 51. The protrusion piece 11i of the housing 11 is arranged between the pair of input-side clutch rollers 55.

Output-Side Clutch

Returning to FIGS. 2 and 3, the output-side clutch 60 includes the output-side inner ring member 61, the output-side outer ring member 62, the release bracket (output-side clutch release member) 64, an output-side clutch roller (output-side transmission member) 65, and an output-side roller biasing spring 66.

The output-side outer ring member 62 is a substantially cylindrical member. The output-side outer ring member 62 is provided coaxially with the rotational axis of the output shaft member 30, and is relatively rotatable with respect to the output-side inner ring member. The output-side outer ring member 62 is arranged on the outer circumferential side of the output-side inner ring member 61. The inner circumferential surface of the inside hole of the output-side outer ring member 62 rotatably supports the large-diameter cylindrical part 32 of the output shaft member 30 through a cylindrical part 13b of the metal bush 13. The flange part 13a of the metal bush 13 slidingly contacts with the output-side inner ring member 61, and prevents that the output-side inner ring member 61 gets out of the output shaft member 30. The cylindrical part 13b of the metal bush 13 is made of a resin. The metal bush 13 applies a frictional force to the output shaft member 30, and suppresses the rotation rate of the output shaft member 30 when the vehicle seat 40 is lowered.

The output-side outer ring member 62 includes a disc-shaped bottom part 62a, a first cylindrical part 62b which extends from the bottom part 62a to the input side in the axial direction and is cylindrical, and a second cylindrical part 62c which extends from the bottom part 62a to the output side in the axial direction. The second cylindrical part 62c has a smaller diameter than the first cylindrical part 62b.

Two taper parts 62d are provided in the outer circumferential edge of the output-side outer ring member 62. The caulking part 11f provided in the housing 11 is bent inward in the radial direction and is caulked in the outer circumferential edge of the output-side outer ring member 62, whereby the output-side outer ring member 62 is fixed not to be rotatable with respect to the housing 11.

The output-side inner ring member 61 is a substantially cylindrical member. The output-side inner ring member 61 is provided coaxially with the rotational axis of the output shaft member 30 and rotates integrally with the output shaft member 30. The output-side inner ring member 61 is a member which has a smaller diameter than the first cylindrical part 62b of the output-side outer ring member. The inner circumferential surface of the inside hole of the output-side inner ring member 61 is provided with a plurality of groove parts, and serves as a spline part 61a in which the spline part 33 of the output shaft member 30 is coupled. The input-side surface of the output-side inner ring member 61 in the axial direction is formed with six protruding parts 61b (see FIG. 3). In the outer circumferential portion of the output-side inner ring member 61, six wedge cam parts 61c which swell outside are formed with a constant interval.

The release bracket 64 is a plate member. The release bracket 64 is connected with the input-side outer ring member 52, and rotates together with the input-side outer ring member 52. The release bracket 64 is a member separate from the output-side inner ring member 61, the output-side outer ring member 62, the input-side inner ring member 51, and the input-side outer ring member 52. By displacing an output-side clutch roller 65 (to be described), the release bracket 64 can be switched between a lock state where the output-side inner ring member 61 and the output-side outer ring member 62 cannot be rotated relatively and a lock release state where the output-side inner ring member 61 and the output-side outer ring member 62 can be rotated relatively. The lock state and the lock release state will be described later in detail.

A first engagement hole 64a having a plurality of groove parts is formed in the inner circumferential surface of the release bracket 64. The first engagement hole 64a is spline-coupled with the fixing part 52d of the input-side outer ring member 52. Accordingly, the release bracket 64 can be rotated together with the input-side outer ring member 52.

The release bracket 64 has a plurality of second engaging holes 64b into which the protruding parts 61b of the output-side inner ring member 61 are inserted. The second engaging holes 64b are long holes which extend in the circumferential direction. In the second engaging hole 64b, the protruding part 61b can be slightly displaced in the circumferential direction. That is, the release bracket 64 and the output-side inner ring member 61 can be relatively rotated in a range where the protruding part 61b is displaced in the second engaging hole 64b. Six protrusion pieces 64c are provided in the outer circumferential edge of the release bracket 64.

As illustrated in FIG. 5A, a gap is provided between the inner circumferential surface of the output-side outer ring member 62 and the outer circumferential surface of the output-side inner ring member 61. While the inner circumferential surface of the output-side outer ring member 62 is a circumferential surface, the six wedge cam parts 61c which swell outside are provided in the outer circumferential surface of the output-side inner ring member 61. For this reason, six portions of which both ends in the radial direction is tapered in a wedge shape are formed in the gap between the inner circumferential surface of the output-side outer ring member 62 and the outer circumferential surface of the output-side inner ring member 61. The six protrusion pieces 64c of the release bracket 64 protrude in the gap. When the release bracket 64 is rotated, the protrusion piece 64c moves in the gap.

The output-side clutch 60 has twelve output-side clutch rollers 65 and six output-side roller biasing springs 66. The output-side clutch rollers 65 and the output-side roller biasing spring 66 are arranged in the gap between the outer circumferential surface of the output-side inner ring member 61 and the inner circumferential surface of the second cylindrical part 62c of the output-side outer ring member 62. The output-side clutch rollers 65 are arranged between the outer circumferential surface of the output-side inner ring member 61 and the inner circumferential surface of the output-side outer ring member 62, and can transmit a rotation force between the output-side inner ring member 61 and the output-side outer ring member 62.

The output-side roller biasing spring 66 is arranged between the wedge cam parts 61c of the output-side inner ring member 61 in the radial direction. In addition, the pair of output-side clutch rollers 65 are arranged on both sides of the wedge cam part 61c of the output-side inner ring member 61. The protrusion piece 64c of the release bracket 64 is arranged between the pair of output-side clutch rollers 65. The output-side clutch rollers 65 are biased by the output-side roller biasing spring 66 toward the top portion of the wedge cam part 61c.

Next, the description will be given about the motion of the above-configured vehicle clutch unit 100. Incidentally, in following description, a case will be described in which the operation lever 21 is rotated in the counterclockwise direction. Since a case where the operation lever 21 is rotated in the clockwise direction is different from the following description only in that the rotation direction is reverse, the description of the case is not given.

Rotating Operation of Operation Lever

As illustrated in FIG. 4A, in the vehicle clutch unit 100, the pair of free ends 23a of the returning spring 23 abut on the spring lock piece 24a and the operation piece part 22d in the neutral state.

As illustrated in FIG. 4B, from the neutral position, when the operation lever 21 is rotated by a rotation angle α in the counterclockwise direction, one free end 23a of the pair of free ends 23a is maintained to be engaged with the spring lock piece 24a, and the other free end 23a is engaged with the operation piece part 22d of the operation plate 22 to move in a separating direction from the one free end 23a.

Further, when the regulation piece parts 22e of the operation plate 22 abuts on the other free end 23a abutting on the spring lock piece 24a, the rotation of the operation lever 21 is regulated. A state where the rotation of the operation lever 21 is regulated means a maximum operating state of the operation lever 21. That is, the operation lever 21 can be rotated in a range where the rotation angle from the neutral state to the maximum operating state reaches a maximum operating angle αmax. In addition, when the operation lever 21 is rotated, the returning spring 23 is bent to apply the returning force in a direction to return to the neutral position.

Next, the description will be given about the motion from the neutral state to the maximum operating state.

Neutral State

FIG. 5A illustrates the output-side clutch 60 in the neutral state. As illustrated in FIG. 5A, in the neutral state, in the output-side clutch 60, the output-side clutch roller 65 is biased by the output-side roller biasing spring 66 toward the top portion of the wedge cam part 61c. Accordingly, the output-side clutch roller 65 is bitten into a wedge-shaped gap between the wedge cam part 61c and the inner circumferential surface of the first cylindrical part 62b.

More specifically, the gap where the first output-side clutch roller 65a is positioned has a wedge shape which is tapered toward the counterclockwise direction. The first output-side clutch roller 65a is biased by the output-side roller biasing spring 66 in the counterclockwise direction. For this reason, the first output-side clutch roller 65a is bitten into the output-side inner ring member 61 and the output-side outer ring member 62 in the counterclockwise direction. The gap where the second output-side clutch roller 65b is positioned has a wedge shape which is tapered toward the clockwise direction. The second output-side clutch roller 65b is biased by the output-side roller biasing spring 66 in the clockwise direction. For this reason, the second output-side clutch roller 65b is bitten into the output-side inner ring member 61 and the output-side outer ring member 62 in the clockwise direction.

The output-side outer ring member 62 cannot move with respect to the housing 11, and the first output-side clutch roller 65a and the second output-side clutch roller 65b are bitten into both the output-side inner ring member 61 and the output-side outer ring member 62 in the counterclockwise direction and in the clockwise direction. Thus, the output-side inner ring member 61 and the output-side outer ring member 62 cannot be rotated. As a result, the output shaft member 30 which is spline-coupled with the output-side inner ring member 61 cannot be rotated.

As described above, in the neutral state, the output-side inner ring member 61 and the output-side outer ring member 62 are in a lock state to make the rotation disable. Thus, the output shaft member 30 is not rotated even when the rotation force is applied from the vehicle seat 40 side to the output shaft member 30. Accordingly, the vehicle seat 40 is fixed in a state where the height thereof is maintained.

FIG. 5B illustrates the input-side clutch 50 in the neutral state. As illustrated in FIG. 5B, in the neutral state, in the input-side clutch 50, the input-side clutch roller 55 does not contact with the input-side roller biasing spring 56, and the input-side clutch roller 55 is not biased by the input-side roller biasing spring 56 toward the top portion of the wedge cam part 51c. For this reason, in the neutral state, the input-side clutch roller 55 is not bitten into the input-side inner ring member 51 and the input-side outer ring member 52. Accordingly, when the operation lever 21 is rotated, the input-side outer ring member 52 can be rotated together with the input-side inner ring member 51 through the input-side clutch roller 55.

Initial Stage of Rotation

Figure 6A:
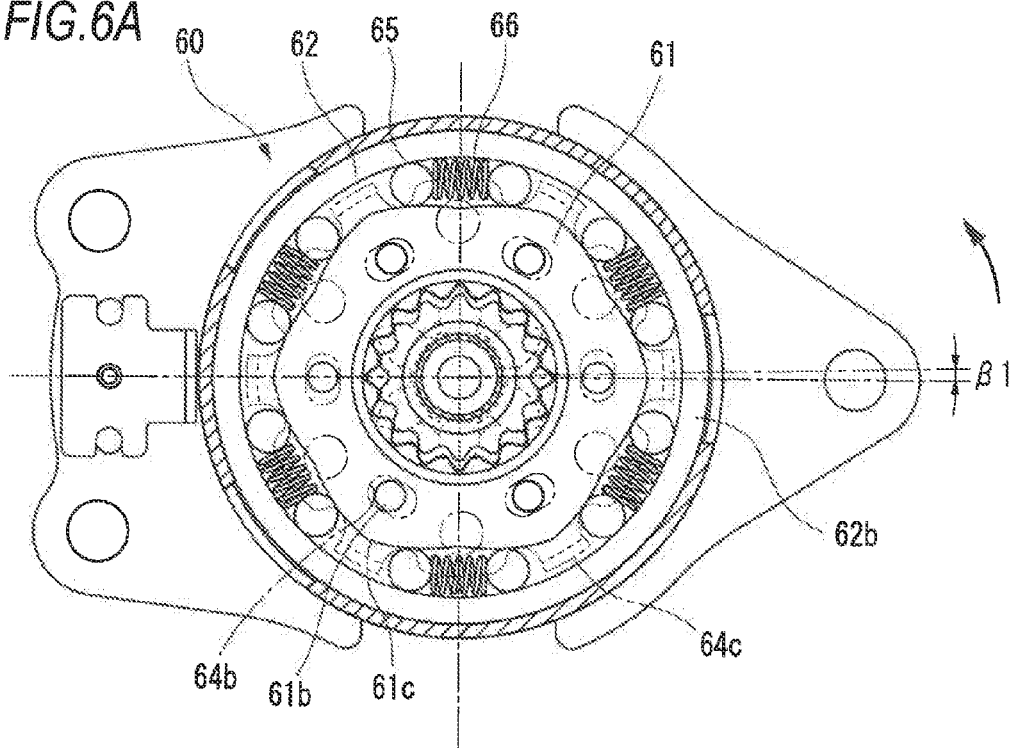
Figure 6B:
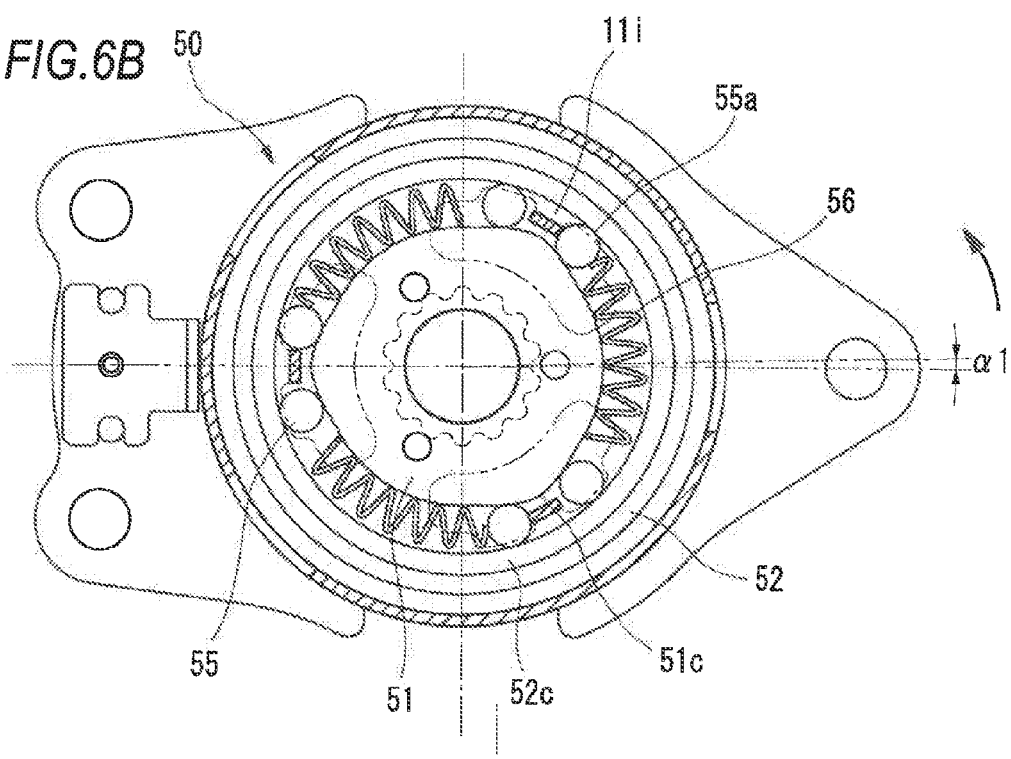

FIGS. 6A and 6B are views illustrating a state where the operation lever 21 is rotated from the neutral position by a minute angle α1 in the counterclockwise direction. FIG. 6A illustrates the output-side clutch 60, and FIG. 6B illustrates the input-side clutch 50.

As illustrated in FIG. 6B, when the operation lever 21 is rotated from the neutral position by the angle α1 in the counterclockwise direction, the rotation is transmitted to the input-side inner ring member 51 through the operation plate 22 and the operation bracket 54. Thus, the input-side inner ring member 51 is rotated together with the operation lever 21 by the angle α1, and the input-side outer ring member 52 is rotated together with the input-side inner ring member 51 through the input-side clutch roller 55.

The input-side outer ring member 52 of the input-side clutch 50 is spline-coupled to the release bracket 64. For this reason, as illustrated in FIG. 6A, when the input-side outer ring member 52 is rotated, the release bracket 64 is also rotated together with the input-side outer ring member 52 by an angle β1.

Incidentally, in the state illustrated in FIG. 6A, the inner circumferential surface of the second engaging hole 64b of the release bracket 64 abuts on the protruding part 61b of the output-side inner ring member 61. For this reason, the rotation from the input-side outer ring member 52 is not transmitted to the output-side inner ring member 61 or the output-side outer ring member 62, and the output-side inner ring member 61 or the output-side outer ring member 62 is not rotated.

Output-Side Lock Release

Figure 7A:
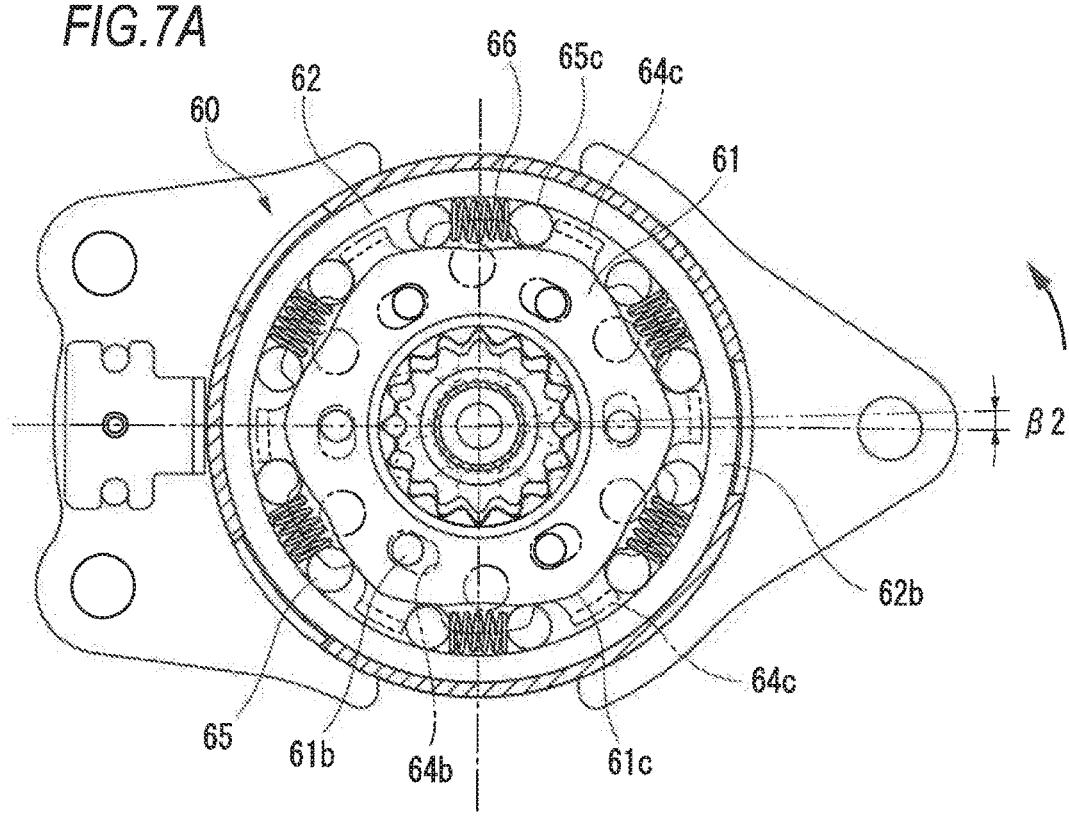
Figure 7B:
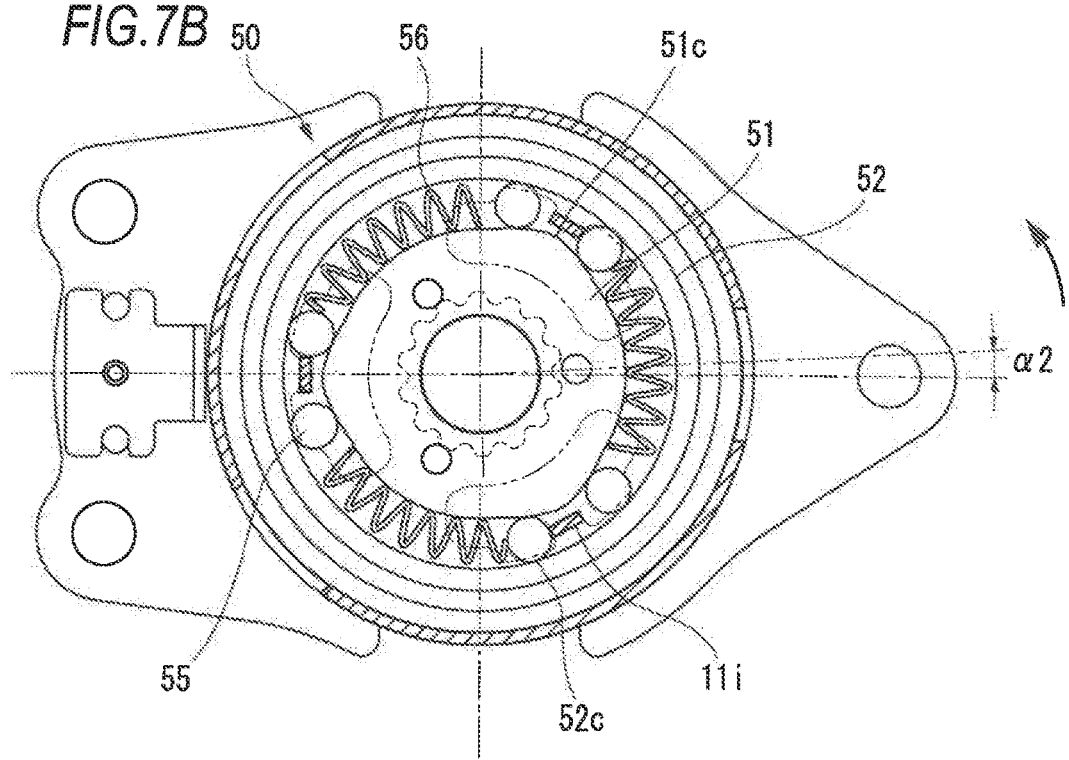

FIGS. 7A and 7B are views illustrating a state where the operation lever 21 is rotated further from the state of FIGS. 6A and 6B in the counterclockwise direction. FIG. 7A illustrates the output-side clutch 60, and FIG. 7B illustrates the input-side clutch 50.

As illustrated in FIG. 7B, when the operation lever 21 is rotated further in the counterclockwise direction, the input-side inner ring member 51 and the input-side outer ring member 52 are rotated such that the rotation angle of the input-side inner ring member 51 and the input-side outer ring member 52 becomes α2 (α2>α1).

Thus, as illustrated in FIG. 7A, the release bracket 64 which rotates together with the input-side outer ring member 52 is rotated to reach the angle β2. When the rotation angle of the release bracket 64 reaches β2 (output-side lock release angle), the protrusion piece 64c of the release bracket 64 abuts on the output-side clutch roller 65c which is adjacent to the protrusion piece 64c in the counterclockwise direction, and the output-side clutch roller 65c is pressed in a counterclockwise rotation direction. Thus, a state where the wedge cam part 61c of the output-side clutch roller 65c is bitten into the inner circumferential surface of the first cylindrical part 62b is released. Accordingly, the output-side outer ring member 62 and the output-side inner ring member 61 become to be rotatable in the counterclockwise direction.

Rotation Force Transmission State

Figure 8A:
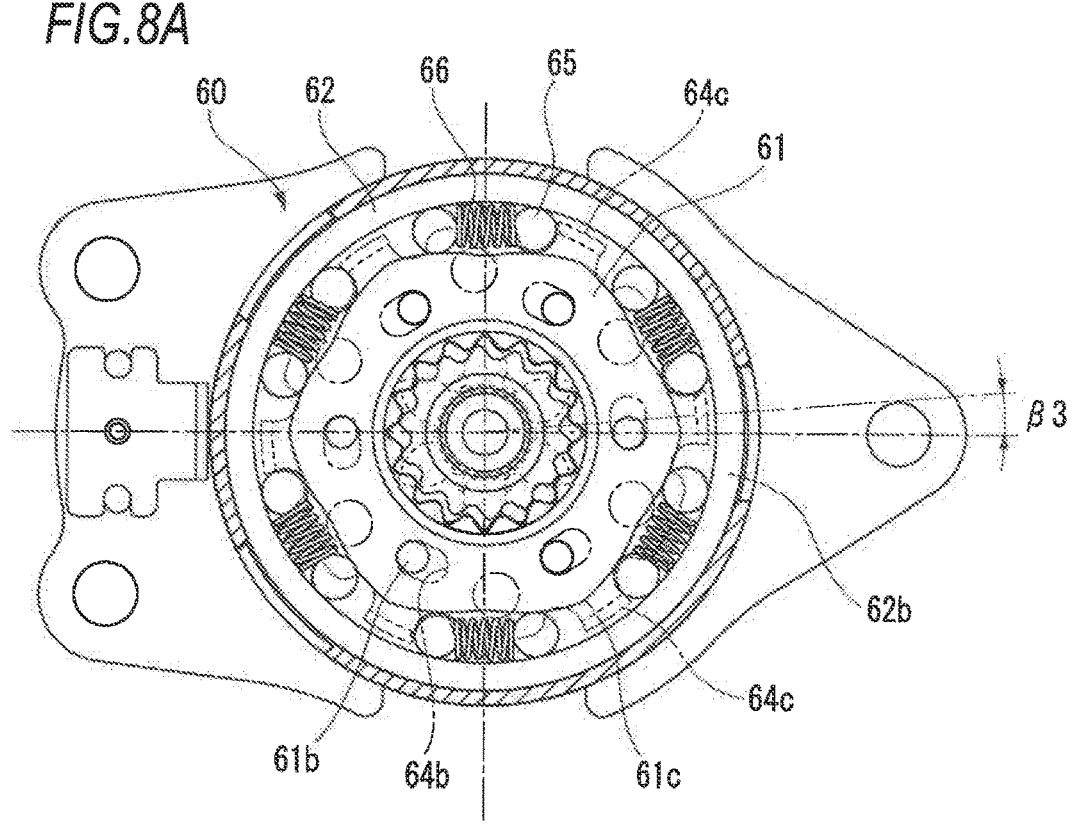
Figure 8B:
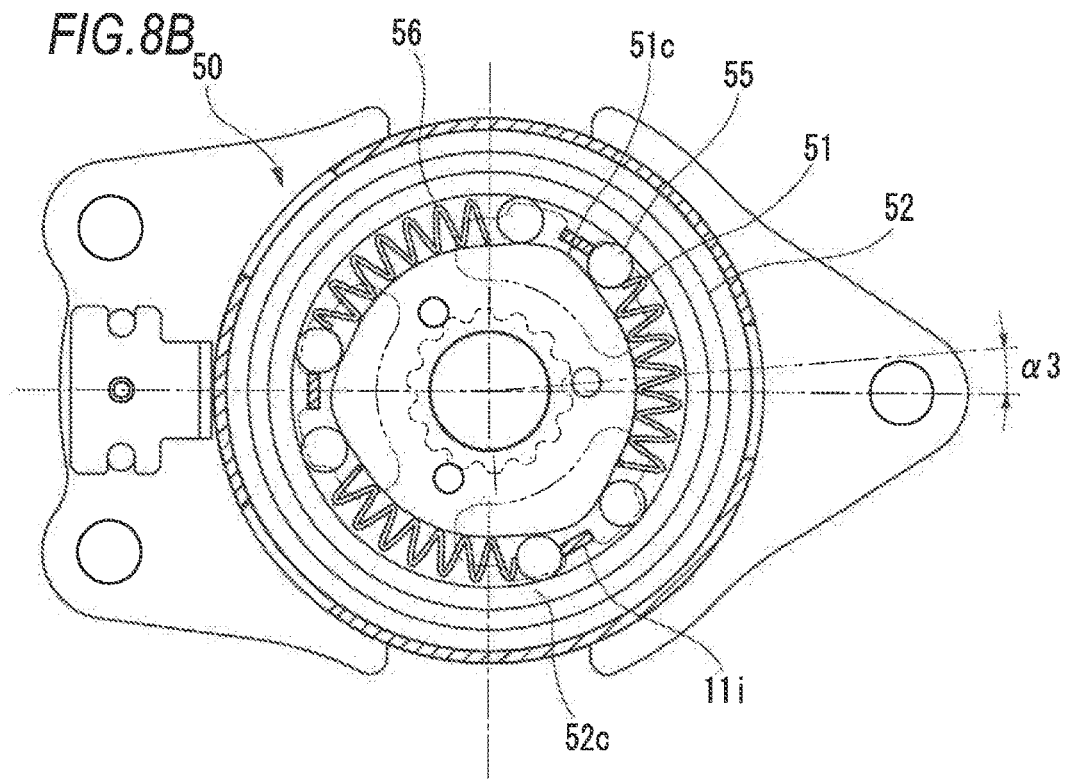

FIGS. 8A and 8B are views illustrating a state where the operation lever 21 is further rotated in the counterclockwise direction from the state of FIGS. 7A and 7B. FIG. 8A illustrates the output-side clutch 60, and FIG. 8B illustrates the input-side clutch 50.

As illustrated in FIG. 8B, when the operation lever 21 is rotated in the counterclockwise direction, the input-side inner ring member 51 and the input-side outer ring member 52 are rotated such that the rotation angle of the input-side inner ring member 51 and the input-side outer ring member 52 becomes α3 (α3>α2).

Thus, as illustrated in FIG. 8A, the release bracket 64 is rotated to the angle β3 (β3>β2) in the counterclockwise direction. Further, when the rotation angle of the release bracket 64 reaches β3, the inner circumferential surface of the second engaging hole 64b of the release bracket 64 abuts on the protruding part 61b of the output-side inner ring member 61. Accordingly, the rotation of the release bracket 64 becomes transmittable to the output-side inner ring member 61. In addition, as illustrated in FIGS. 7A and 7B, the output-side inner ring member 61 and the output-side outer ring member 62 already become rotatable in the counterclockwise direction. For this reason, when the operation lever 21 is further rotated in the counterclockwise direction from the state of FIGS. 8A and 8B, the output-side inner ring member 61 and the output-side outer ring member 62 are rotated in the counterclockwise direction, and the output shaft member 30 spline-coupled to the output-side outer ring member 62 rotates in the counterclockwise direction. Accordingly, the height of the sitting seat 40a of the vehicle seat 40 is displaced.

Maximum Rotating State

Figure 9A:
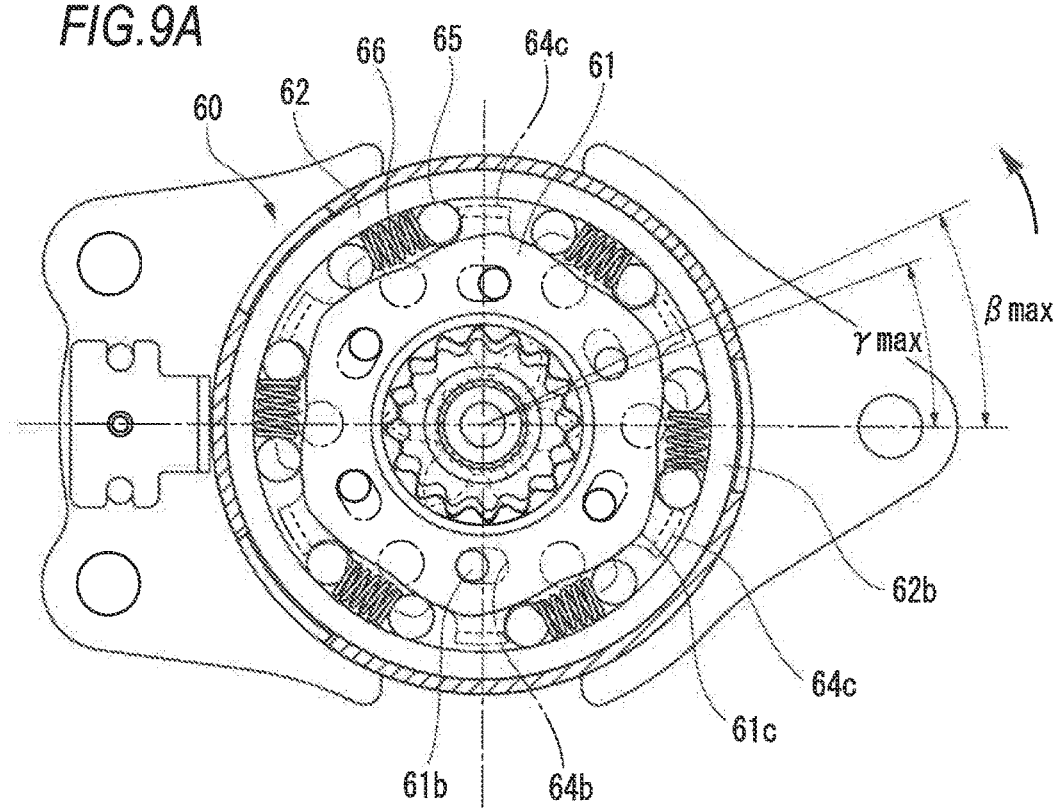
Figure 9B:
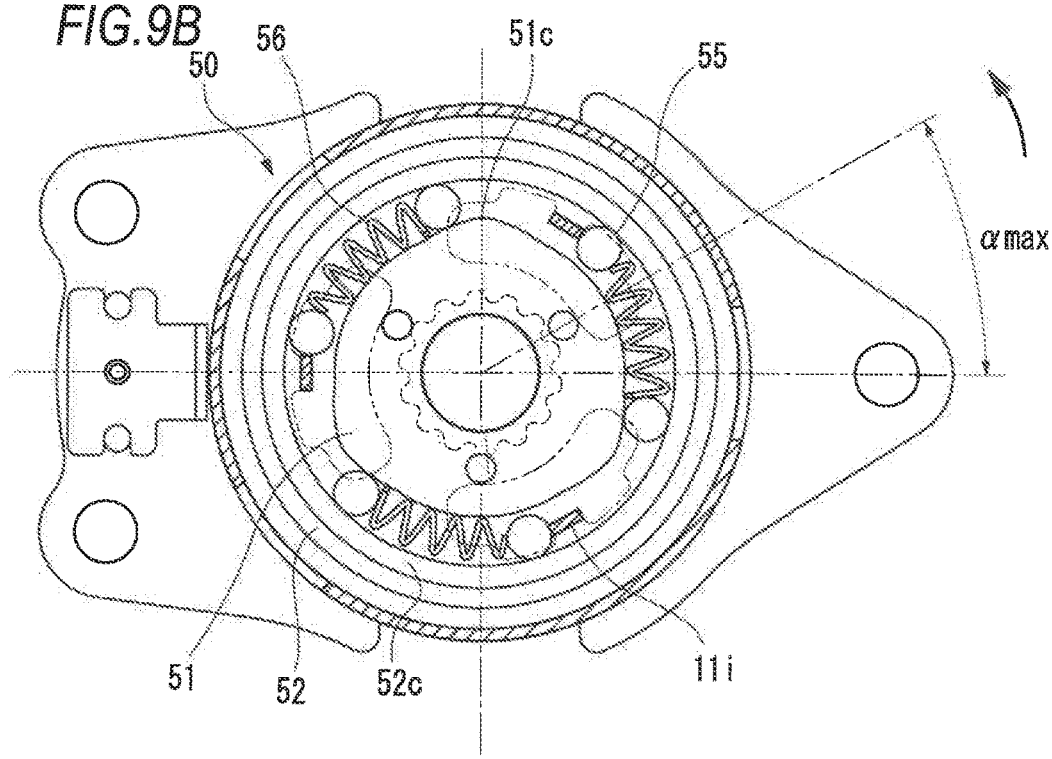

FIGS. 9A and 9B are views illustrating a state where the operation lever 21 is rotated to the maximum operating angle αmax in the counterclockwise direction. FIG. 9A illustrates the output-side clutch 60, and FIG. 9B illustrates the input-side clutch 50.

When the operation lever 21 is rotated to reach the maximum operating angle αmax, the vehicle clutch unit 100 becomes the maximum rotating state. In the state, the regulation piece part 22e of the operation plate 22 abuts on the other free end 23a abutting on the spring lock piece 24a, and the rotation of the operation lever 21 is regulated (see FIG. 4B).

In the maximum rotating state, as illustrated in FIG. 9B, the rotation angle α of the input-side inner ring member 51 and the input-side outer ring member 52 in the counterclockwise direction becomes the maximum rotation angle αmax. In addition, as illustrated in FIG. 9A, the rotation angle of the release bracket 64 in the counterclockwise direction becomes a maximum rotation angle βmax. Further, a counterclockwise rotation angle γ of the output-side inner ring member 61 rotated together with the release bracket 64 becomes a maximum rotation angle γmax.

Returning to Neutral State

When one rotating operation by the operation lever 21 is ended, and the operator releases the rotation force applied to the operation lever 21, the operation lever 21 is rotated toward the initial neutral position in the clockwise direction by the returning force by the bent returning spring 23. Thus, in the input-side clutch 50, when the operation lever 21 is rotated in the counterclockwise direction, the input-side inner ring member 51 is rotated in the counterclockwise direction through the operation plate 22 and the operation bracket 54.

Incidentally, when the rotation angle of the input-side inner ring member 51 illustrated in FIG. 6B becomes in a state where the rotation angle of the input-side inner ring member 51 is larger than the state of α1 (the state illustrated in FIGS. 7A to 9B), the protrusion piece 11i of the housing 11 abuts on an input-side clutch roller 55a which is adjacent to the protrusion piece 11i of the housing 11 in the clockwise direction to press the input-side clutch roller 55a in the counterclockwise direction. Accordingly, a state where the input-side clutch roller 55a is bitten into the wedge cam part 51c and the outer ring part 52c is released. When the input-side inner ring member 51 is rotated from the state in the clockwise direction, the input-side clutch roller 55a cannot transmit the clockwise rotation of the input-side inner ring member 51 to the input-side outer ring member 52.

For this reason, in a state where the rotation angle of the input-side inner ring member 51 illustrated in FIG. 6B becomes in a state where the rotation angle of the input-side inner ring member 51 is larger than the state of α1 (the state illustrated in FIGS. 7A to 9B), the input-side inner ring member 51 idles with respect to the input-side outer ring member 52, only the input-side inner ring member 51 rotates in the clockwise direction, and the input-side outer ring member 52 does not rotate. Accordingly, when the operation lever 21 returns to the neutral position, only the input-side inner ring member 51 returns to the neutral position (see FIG. 5B) together with the operation lever 21, and in the output-side clutch 60, the release bracket 64 is not rotated. As a result, the output shaft member 30 becomes in a state where a rotation phase is maintained (see FIG. 9A).

As described above, in the above-described vehicle clutch unit 100, in the input-side clutch 50, when the operation lever 21 is operated to be driven from the neutral position, the input-side inner ring member 51 rotates according to the rotation of the operation lever 21, and by rotating the input-side outer ring member 52 through the input-side clutch roller 55, the rotation of the operation lever 21 is transmitted to the output-side clutch 60. Further, during a returning motion of returning to the neutral position after the operation of the operation lever 21, the operation lever 21 returns to the neutral position while the rotation position of the output shaft member 30 is held. In addition, the output-side clutch 60 regulates the rotation of the output shaft member 30 by force which is input from the vehicle seat 40 side to the output shaft member 30.

In addition, in the vehicle clutch unit 100 according to the embodiment, when the operation lever 21 is rotated, the rotation of the input-side inner ring member 51 of the input-side clutch 50 is transmitted to the input-side outer ring member 52, whereby the responsiveness of the output shaft member 30 is improved.

Co-Rotation

Figure 10A:
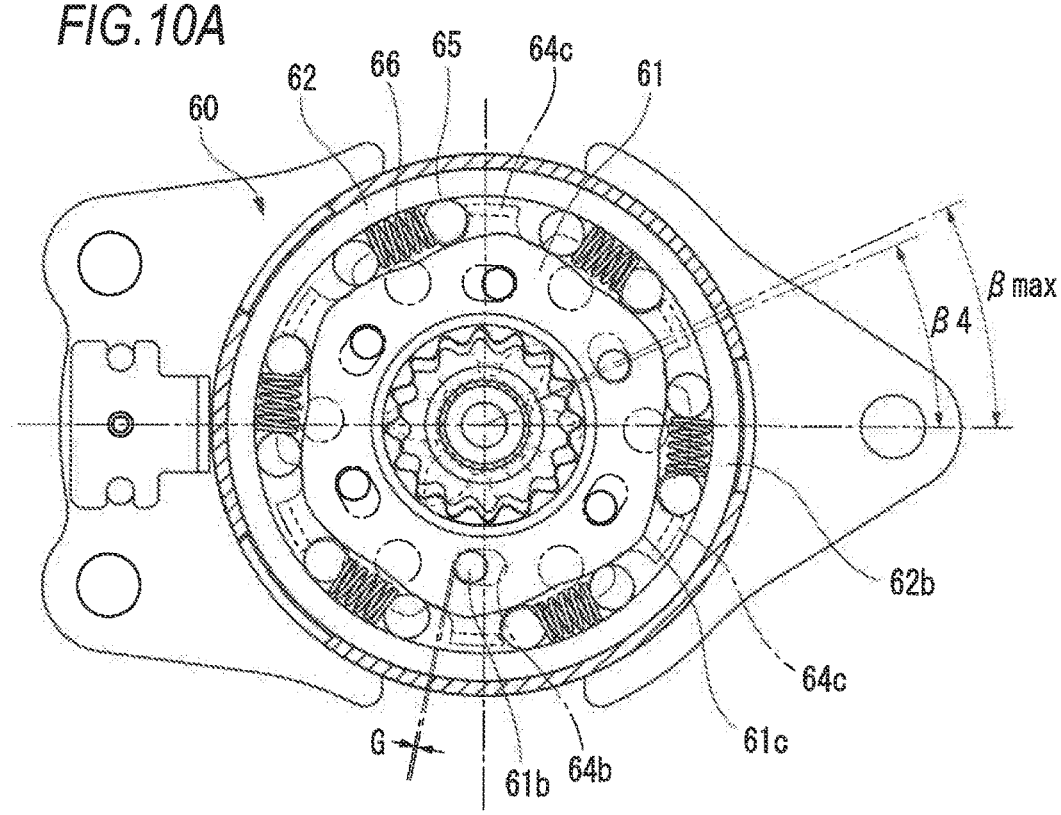
Figure 10B:
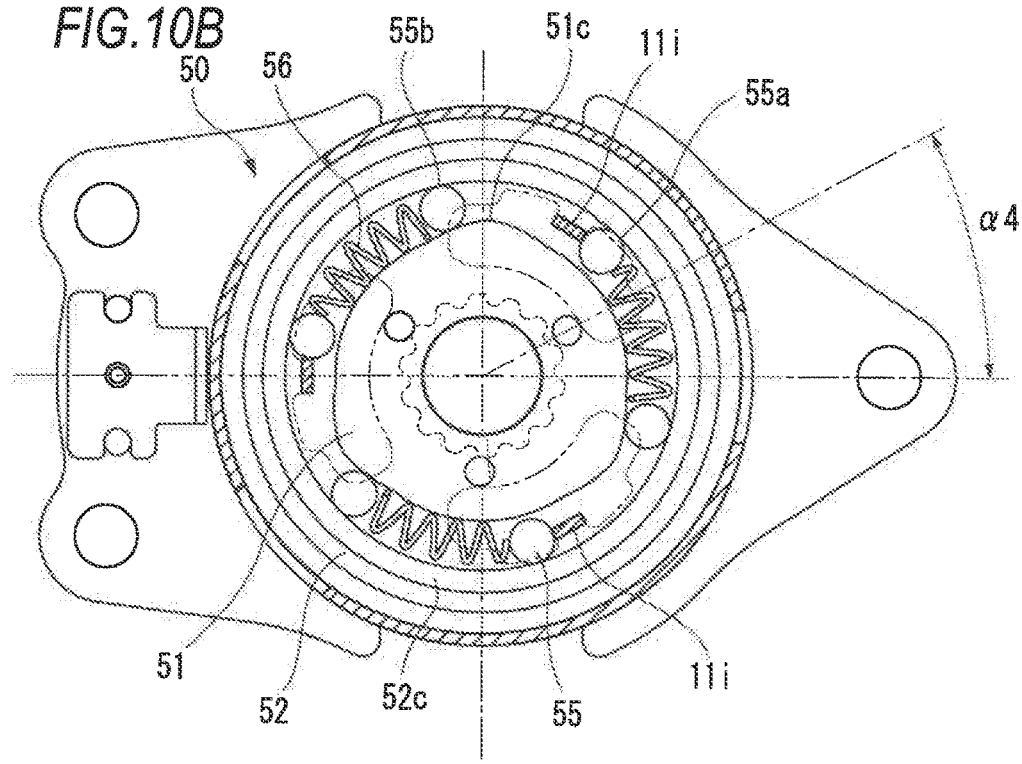
Figure 11A:
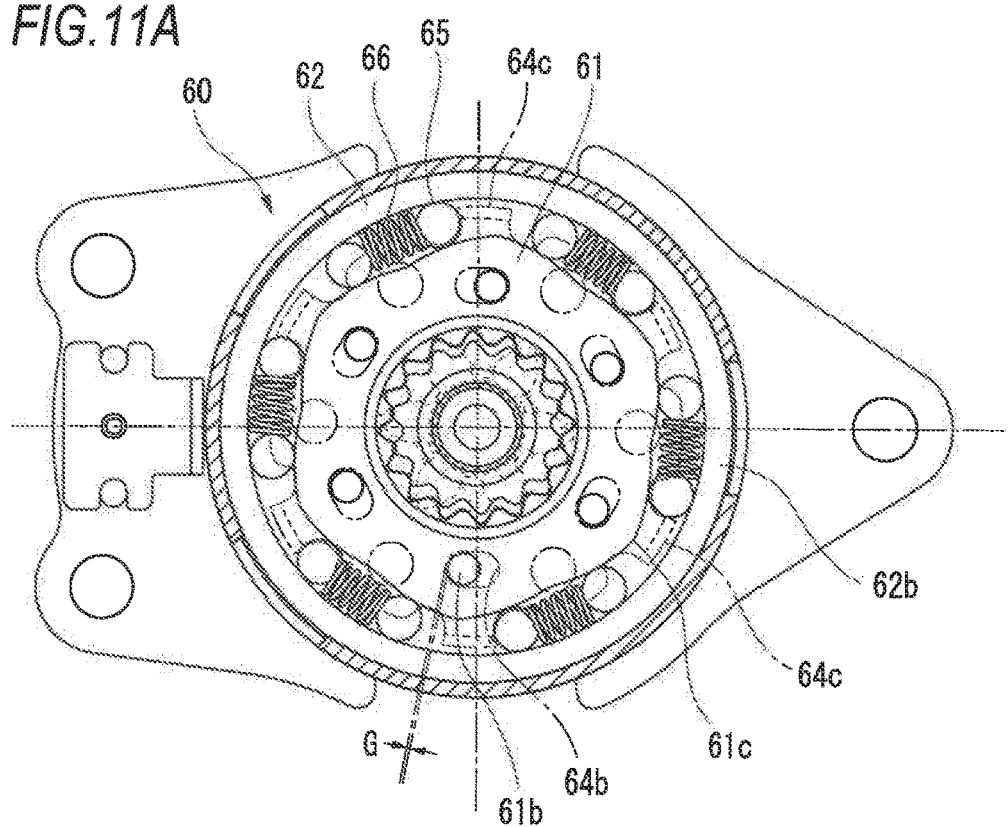
Figure 11B:
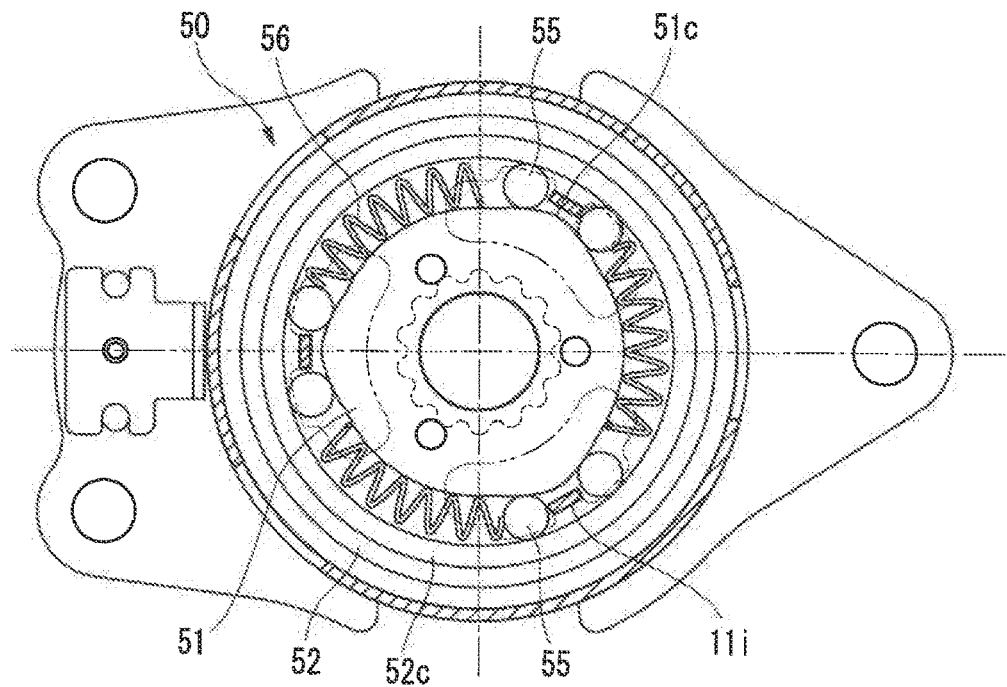

Herein, a co-rotation of the input-side outer ring member 52 will be described with reference to FIGS. 10A to 11B. FIGS. 10A to 11B illustrate a state where the vehicle clutch unit which moves as described above and does not include a rotation suppressing member 70 (to be described) returns to the neutral position. FIGS. 10A and 10B illustrate the state of starting to return from the maximum rotating state (FIGS. 9A and 9B), and FIGS. 11A and 11B illustrate a state where the operation lever 21 returns to the neutral state.

When the operation lever 21 returns to the neutral position after the counterclockwise rotating operation by the operation lever 21 ends, as described above, in the input-side clutch 50, the operation lever 21 is rotated in the clockwise direction, and the input-side inner ring member 51 rotates in the clockwise direction through the operation plate 22 and the operation bracket 54. FIGS. 10A and 10B illustrate a state immediately after the operation lever 21 is released from the maximum rotating state, and illustrates a state where the input-side inner ring member 51 has an angle α4 slightly smaller than the maximum rotation angle αmax.

At that time, as illustrated in FIG. 10B, in the input-side clutch 50, in the input-side clutch roller 55a which is positioned from the protrusion piece 11i of the housing 11 in the counterclockwise direction, a state where the input-side inner ring member 51 and the input-side outer ring member 52 are bitten is released. However, the input-side clutch roller 55b which is positioned from the protrusion piece 11i of the housing 11 in the clockwise direction is pressed by the input-side roller biasing spring 56, and is maintained to be bitten into the input-side inner ring member 51 and the input-side outer ring member 52.

As described above, in a state where the input-side clutch roller 55b is pressed by the input-side roller biasing spring 56, the frictional force is applied between the input-side clutch roller 55b and the input-side inner ring member 51, and between the input-side clutch roller 55b and the input-side outer ring member 52. Until the input-side roller biasing spring 56 returns to a natural length, and the input-side clutch roller 55b is not pressed by the input-side roller biasing spring 56, the frictional force continuously is applied between the input-side clutch roller 55b, and the input-side inner ring member 51 and the input-side outer ring member 52. As a result, although it is intended originally that the input-side outer ring member 52 is not rotated and only the input-side inner ring member 51 is rotated during the returning motion of the operation lever 21, the clockwise rotation of the input-side inner ring member 51 is transmitted to the input-side outer ring member 52 through the input-side clutch roller 55b.

Thus, the unintentional clockwise rotation of the input-side outer ring member 52 is transmitted to the spline-coupled release bracket 64. Accordingly, as illustrated in FIG. 10A, the rotation angle β4 of the release bracket 64 in the counterclockwise direction becomes an angle slightly smaller than the maximum rotation angle αmax. According to the unintentional rotation of the input-side outer ring member 52, a state where the inner circumferential surface of the second engaging hole 64b of the release bracket 64 abuts on the protruding part 61b of the output-side inner ring member 61 is changed into a state where a minute gap G is formed between the inner circumferential surface of the second engaging hole 64b and the protruding part 61b.

Thereafter, the operation lever 21 returns to the neutral position. The input-side inner ring member 51 returns to the neutral position as illustrated in FIG. 11B, but the release bracket 64 is displaced by the gap G in the clockwise direction as illustrated in FIG. 11A.

As a result, in a case where the operation lever 21 is rotated again in the counterclockwise direction in order to rotate the output shaft member 30 again in the counterclockwise direction from the state of FIGS. 11A and 11B, the timing when the rotation of the release bracket 64 is transmitted to the output-side inner ring member 61 is delayed by the gap G formed between the inner circumferential surface of the second engaging hole 64b and the protruding part 61b. Thus, the responsiveness is deteriorated.

In this regard, as illustrated in FIGS. 2 and 3, the rotation suppressing member 70 such as a wave washer is provided between the input-side clutch 50 and the output-side clutch 60, and the rotation suppressing member 70 is biased in a direction in which the input-side outer ring member 52 and the release bracket 64 are separated to each other.

That is, the rotation suppressing member 70 which applies a rotation resistance force larger than the co-rotation force between the input-side outer ring member 52 and a member which is not rotated during the returning motion of the operation lever 21 (housing 11, in the embodiment) is provided so as to suppress the co-rotation of the input-side outer ring member 52 by the input-side inner ring member 51 during the returning motion of the operation lever 21. In the vehicle clutch unit 100 according to the embodiment, the input-side outer ring member 52 is pushed by the rotation suppressing member 70 in the axial direction, and a force occurs which counteracts the force which co-rotates the input-side outer ring member 52. In the embodiment, the rotation suppressing member 70 pushes the input-side outer ring member 52 to the housing 11 through the input-side inner ring member 51.

Therefore, it is regulated that the input-side outer ring member 52 is rotated during the returning motion of the operation lever 21. For this reason, it is suppressed that the input-side outer ring member 52 is co-rotated by the input-side inner ring member 51 in a returning direction during the returning motion of the operation lever 21. Accordingly, the responsiveness during the continuous operation of the operation lever 21 is improved.

In addition, the rotation suppressing member 70 pushes the input-side clutch 50 (the other member of the input-side outer ring member 52 and the input-side inner ring member 51) toward the bottom surface 11a of the housing 11. Thus, the rattling of the input-side clutch 50 in the axial direction can be prevented. As described above, the rotation suppressing member 70 also functions as a spring for preventing the rattling, and has the smaller number of components compared to a case where the spring is provided additionally.

Furthermore, the rotation suppressing member 70 presses the input-side outer ring member 52 and the release bracket 64 (rotation transmitting part) in a direction to be separated in the axial direction. As described above, by biasing the release bracket 64 in the axial direction, an engaging margin of the release bracket 64 and the output-side inner ring member 61 can be increased, and the lock of the output-side clutch 60 can be released more reliably. In addition, the rotation suppressing member 70 is positioned between the input-side outer ring member 52 and the release bracket 64, and thus, the rotation suppressing member 70 easily presses the input-side outer ring member 52 and the release bracket 64 (rotation transmitting part) in a direction to be separated in the axial direction.

The output-side clutch 60 includes the output-side inner ring member 61, the output-side outer ring member 62, the output-side clutch roller 65 (output-side transmission member), and the output-side roller biasing spring 66 (elastic member). The output-side clutch roller 65 and the output-side roller biasing spring 66 are arranged between the outer circumferential surface of the output-side inner ring member 61 and the inner circumferential surface of the output-side outer ring member 62. During the returning motion of the operation lever 21, the output-side roller biasing spring 66 generates an elastic force to press the output-side clutch roller 65 such that the output-side clutch roller 65 moves together with the release bracket 64 (rotation transmitting part). Therefore, during the returning motion of the operation lever 21 to the neutral position, the output-side clutch roller 65 is pushed between the wedge cam part 61c and the inner circumferential surface of the first cylindrical part 62b without clearance, and the output-side inner ring member 61 can be locked to the output-side outer ring member 62.

In addition, the vehicle clutch unit 100 has the housing 11 which has a bottomed cylindrical shape and houses the input-side clutch 50 (the other member of the input-side outer ring member 52 and the input-side inner ring member 51). The rotation suppressing member 70 pushes the input-side clutch 50 toward the bottom surface 11a of the housing 11. The rotation suppressing member 70 is positioned between the input-side outer ring member 52 and the release bracket 64.

As described above, the rotation suppressing member 70 is positioned between the input-side outer ring member 52 (the other member) and the release bracket 64 (rotation transmitting part). Thus, a structure is easily configured in which the rotation suppressing member 70 pushes the input-side clutch 50 toward the bottom surface 11a of the housing 11, and presses the release bracket 64 to the output side in a rotational axis direction.

Incidentally, in the above-described embodiment, the description has been given about an example in which the wave washer is used as the rotation suppressing member 70, but this disclosure is not limited thereto. For example, a compression spring may be used which applies a rotation resistance force larger than the co-rotation force between the input-side outer ring member 52 and the housing 11.

Otherwise, a brake pad attached in the outer circumferential surface of the input-side outer ring member 52 and a brake pad attached on the inner circumferential surface of the housing 11 may be adopted as the rotation suppressing member 70. A large static frictional force which is applied to both brake pads suppresses that the input-side outer ring member 52 moves out from the housing 11, and the co-rotation of the input-side outer ring member 52 is suppressed.

In addition, in the above-described embodiment, the housing 11 is used as a member which does not rotate during the returning motion of the operation lever 21, but this disclosure is not limited to the housing 11. For example, in the case of the member, which does not rotate during the returning motion of the operation lever 21, such as a component which is fixed in the housing 11 separately from the housing 11, the rotation resistance force larger than the co-rotation force between the corresponding member and the input-side outer ring member 52 can be applied by the rotation suppressing member 70.

In addition, in the above-described embodiment, the configuration has been described in which the input-side inner ring member 51 rotates together with the operation lever 21, but this disclosure is not limited to this disclosure. For example, a configuration may be adopted in which the input-side outer ring member rotates together with the operation lever 21. In this case, the rotation suppressing member 70 is configured such that the rotation resistance force larger than the force to co-rotate the input-side inner ring member is applied between the input-side inner ring member and the member which does not rotate during the returning motion of the operation lever 21, thereby suppressing the co-rotation of the input-side inner ring member by the input-side outer ring member.

Next, a stopper projection 80 will be described with reference to FIG. 12.

Figure 12:
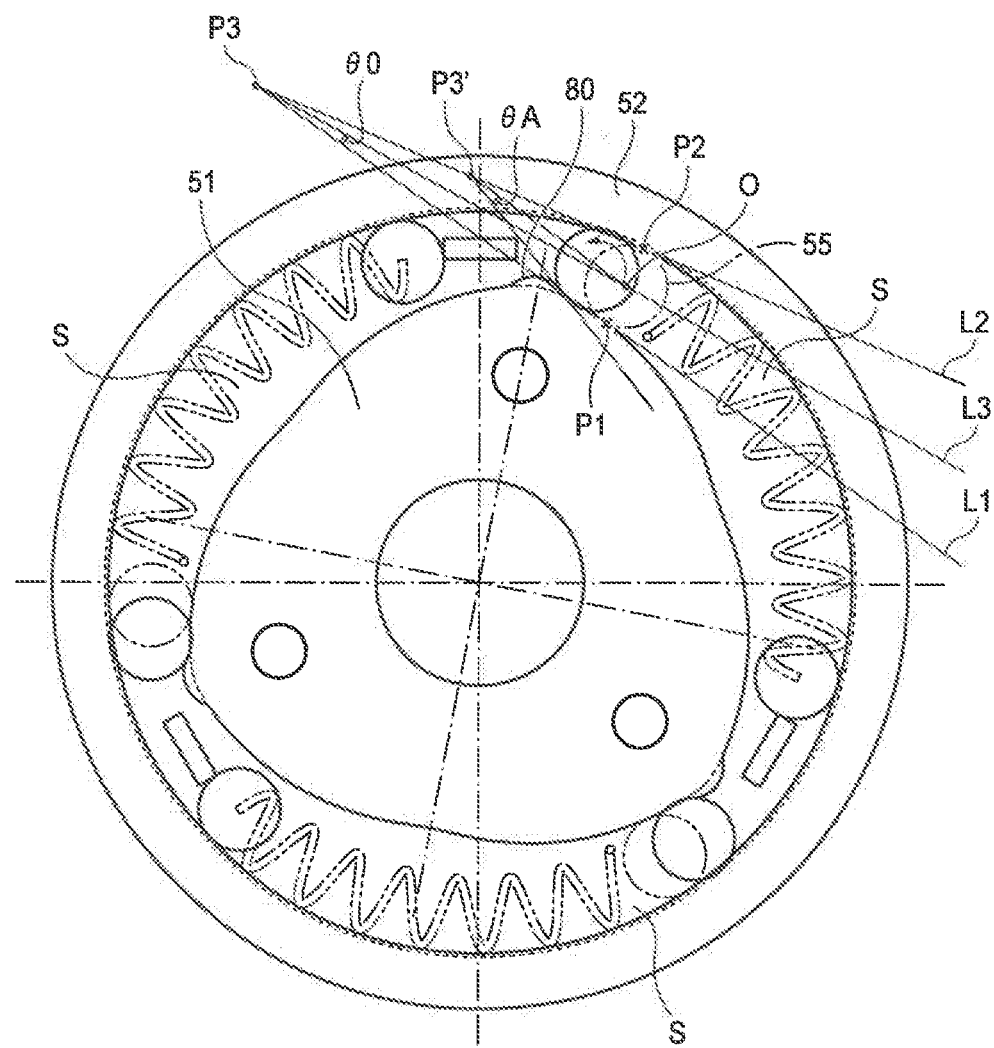
FIG. 12 is a schematic view illustrating an input-side inner ring member, an input-side outer ring member, and an input-side clutch roller of the embodiment.

FIG. 12 is a schematic view illustrating the input-side inner ring member 51, the input-side outer ring member 52, and the input-side clutch roller 55 of the embodiment. Incidentally, for convenience of description, the stopper projection 80 is not illustrated in FIGS. 2, 5B, 6B, 7B, 8B, 9B, 10B and 11B.

As illustrated in FIG. 12, in the embodiment, the stopper projection 80 is provided in the outer circumferential surface of the input-side inner ring member 51. Three wedge-shaped spaces S are provided between the outer circumferential surface of the input-side inner ring member 51 and the inner circumferential surface of the input-side outer ring member 52. The wedge-shaped spaces S are shaped to be tapered in the counterclockwise direction. The stopper projection 80 is provided at the tip-side position of the taper of the wedge-shaped space S. The stopper projection 80 protrudes from the input-side inner ring member 51 toward the wedge-shaped space S.

As illustrated in FIG. 12, when seen in the rotational axis line direction, an acute angle formed by a segment L3 and an inside tangential line L1 is defined as a wedge angle θ. The segment L3 connects an intersection point P3 between the inside tangential line L1 at a contact point P1 of the input-side clutch roller 55 and the input-side inner ring member 51 and an outside tangential line L2 at a contact point P2 of the input-side clutch roller 55 and the input-side outer ring member 52 with a rotational center O of the input-side clutch roller 55.

At that time, in at least one of the outer circumferential surface of the input-side inner ring member 51 and the inner circumferential surface of the input-side outer ring member 52, the stopper projection 80 which forms a wedge angle θA larger than the wedge angle θ0 in an initial position is provided at the tip-side position of the wedge-shaped space S from the initial position.

Incidentally, the initial position indicates a position where the input-side clutch roller 55 contacts with the input-side inner ring member 51 or the input-side outer ring member 52 in a state where a user does not input a torque to the operation lever 21. In FIG. 12, the input-side clutch roller 55 illustrated by a two-dot chain line is positioned in the initial position. The input-side clutch roller 55 is provided to move from the initial position toward the tip of the wedge-shaped space S when an operation torque input to the operation lever 21 is equal to or more than a predetermined torque.

Figure 13:
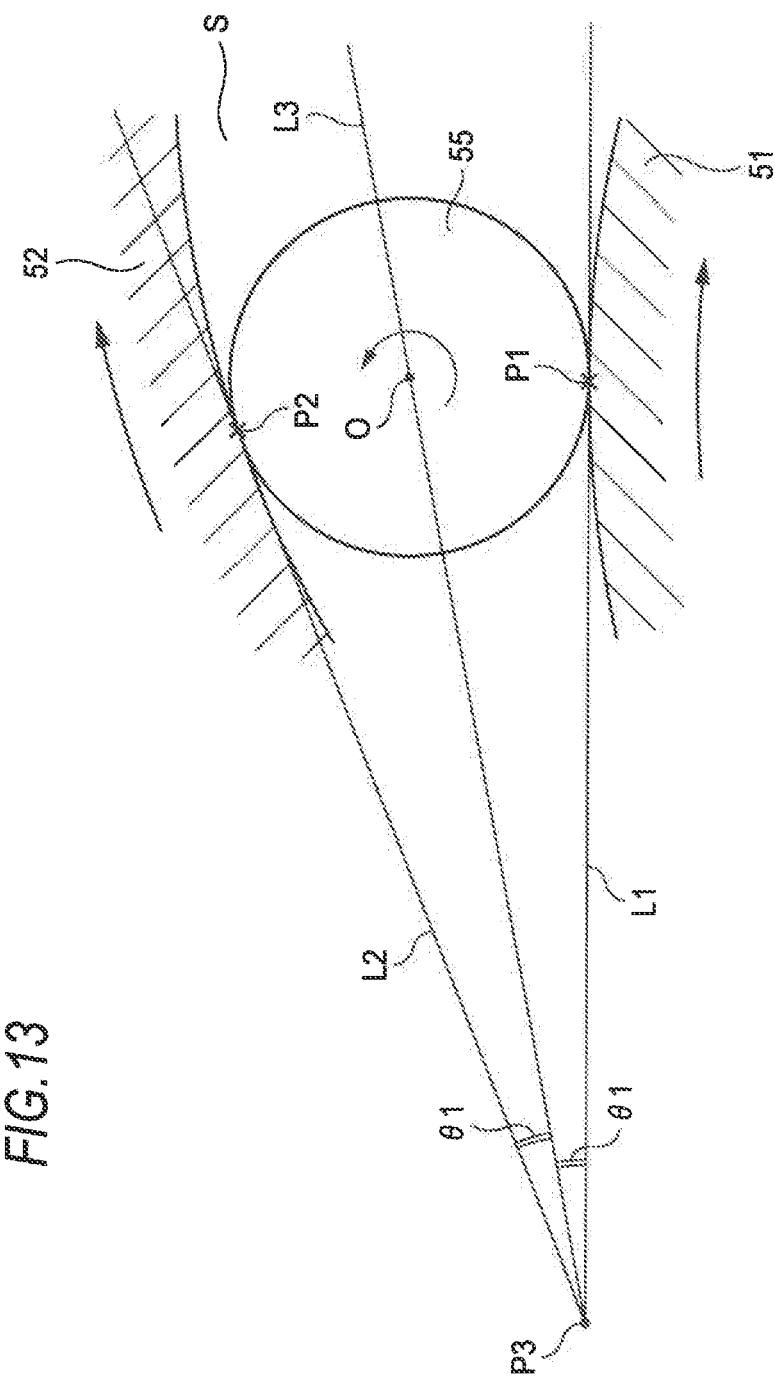
FIG. 13 is an enlarged view illustrating the input-side clutch roller which contacts with the input-side inner ring member and the input-side outer ring member.
Figure 14:
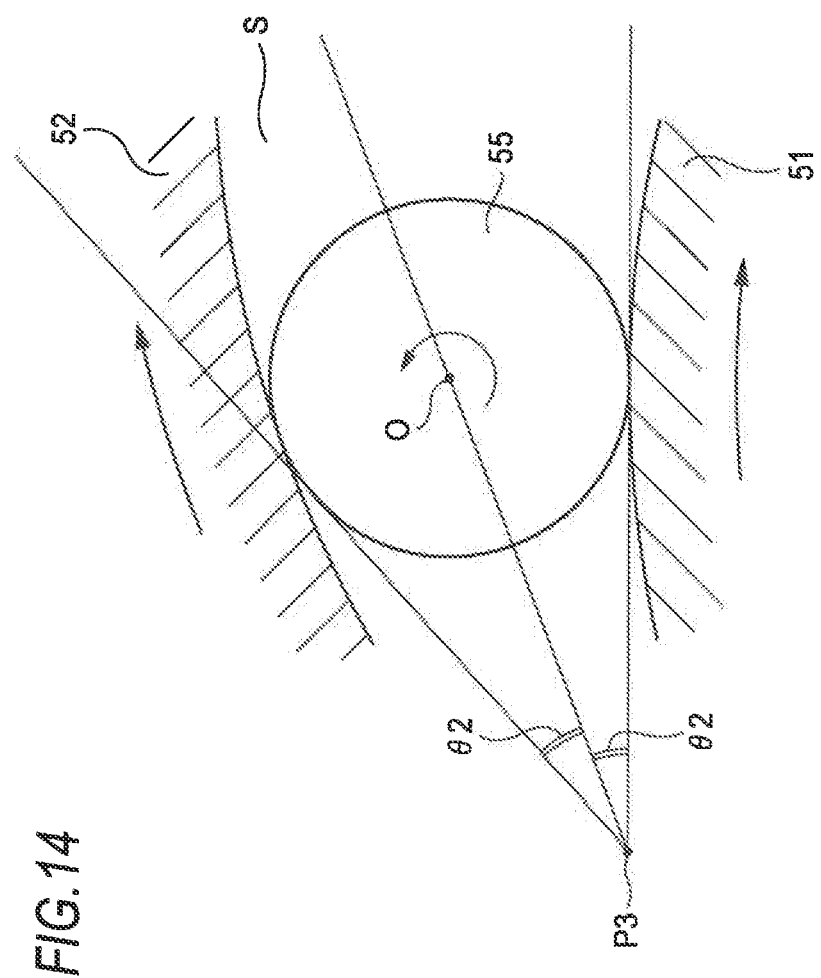
FIG. 14 is a view illustrating an aspect in which a wedge angle is larger compared to the case in FIG. 13.
Figure 15:
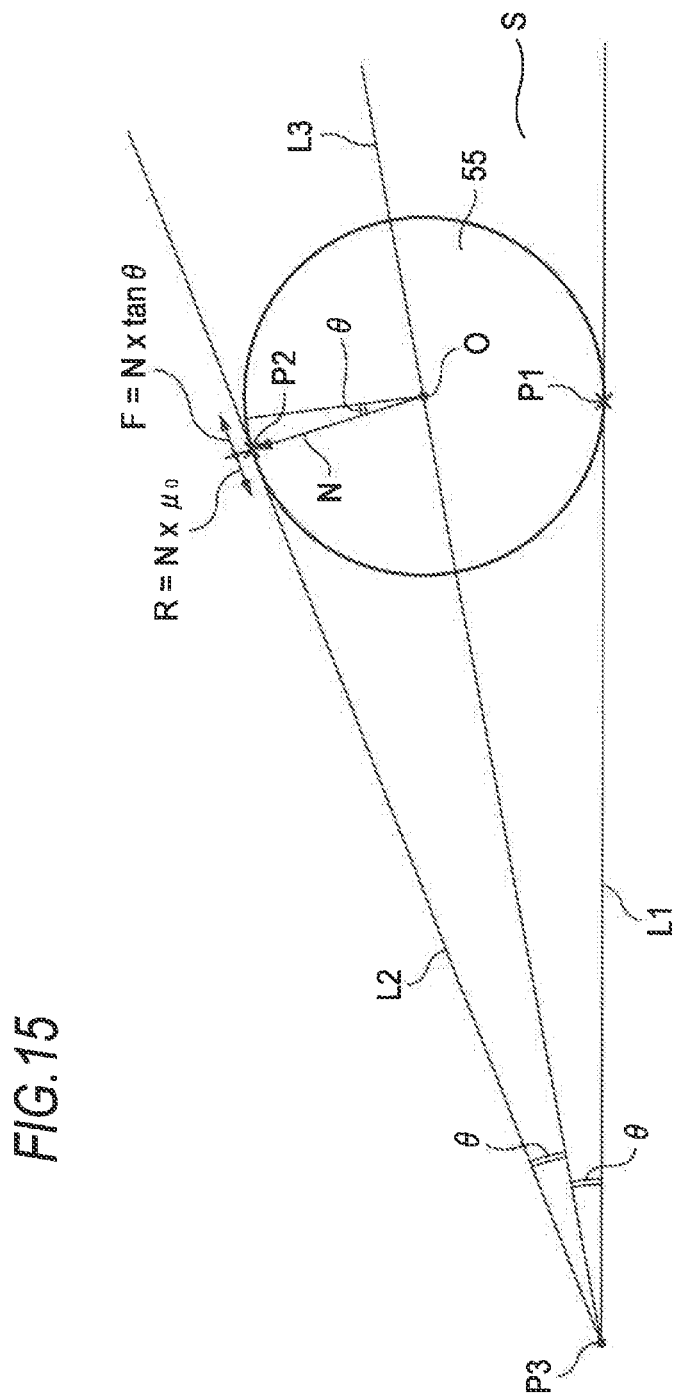
FIG. 15 is a schematic view for explaining a phenomenon in which the input-side clutch roller transmits/does not transmit a torque.

Next, by using FIGS. 13 to 15, a reason is explained that in a case where an excessive torque is input to the operation lever 21, the input-side clutch roller 55 is easily separated by the stopper projection 80 from the input-side outer ring member 52, and the excessive torque is hardly transmitted to the input-side outer ring member 52.

Herein, for convenience of following description, following terms are defined as illustrated in FIG. 13. FIG. 13 is an enlarged view illustrating the input-side clutch roller 55 which contacts with the input-side inner ring member 51 and the input-side outer ring member 52.

The contact point of the input-side inner ring member 51 and the input-side clutch roller 55 is referred to as the inside contact point P1.

The tangential line in the inside contact point P1 is referred to as the inside tangential line L1.

The contact point of the input-side clutch roller 55 and the input-side outer ring member 52 is referred to as the outside contact point P2.

The tangential line in the outside contact point P2 is referred to as the outside tangential line L2.

The intersection point of the inside tangential line L1 and the outside tangential line L2 is referred to as the intersection point P3.

A straight line which connects the intersection point P3 and the rotational center O of the input-side clutch roller 55 is referred to as the straight line L3.

The acute angle formed by the straight line L3 and the inside tangential line L1 is defined as the wedge angle θ. Incidentally, the acute angle formed by the straight line L3 and the outside tangential line L2 also becomes the wedge angle θ.

First, a schematic description will be given, and thereafter, a detailed description will be given by using expressions.

The operation torque input to the operation lever 21 is transmitted to the input-side inner ring member 51. In order to transmit the torque transmitted to the input-side inner ring member 51 to the input-side outer ring member 52, the frictional force is applied between the input-side clutch roller 55, and the input-side inner ring member 51 and the input-side outer ring member 52.

When the input-side inner ring member 51 is rotated in the clockwise direction, the frictional force is applied between the input-side inner ring member 51 and the input-side clutch roller 55, and the frictional force is applied between the input-side clutch roller 55 and the input-side outer ring member 52, so that the input-side outer ring member 52 rotates in the clockwise direction. In this manner, the torque of the input-side inner ring member 51 is transmitted to the input-side outer ring member 52. At that time, when the torque input to the input-side inner ring member 51 becomes large, the input-side outer ring member 52 is elastically deformed outward in the radial direction, and the input-side clutch roller 55 moves to the tip side of the wedge-shaped space S since the wedge-shaped space S is wide.

FIGS. 13 and 14 illustrate an aspect in which the torque of the input-side inner ring member 51 is transmitted to the input-side outer ring member 52. FIG. 14 is a view illustrating a state where the wedge angle is larger than the case of FIG. 13 (θ2>θ1). In FIGS. 13 and 14, the same magnitude of torque is input to the input-side inner ring member 51.

In the state of FIG. 13, the wedge angle θ1 is smaller than that in the state of FIG. 14, and thus the input-side clutch roller 55 is hardly separated from the wedge which is formed by the outer circumferential surface of the input-side inner ring member 51 and the inner circumferential surface of the input-side outer ring member 52. In a case where the ball is pressed in the wedge-shaped space, the press-in ball hardly gets out as the wedge-shaped space is sharper, similarly.

When the wedge angle θ becomes large, the frictional force of the input-side inner ring member 51 of the input-side clutch roller 55 and the input-side outer ring member 52 is not generated. As a result, the input-side clutch roller 55 does not transmit the torque from the input-side inner ring member 51 to the input-side outer ring member 52.

Such a phenomenon will be described in detail by using expressions and FIG. 15. FIG. 15 illustrates only the input-side clutch roller 55, and the input-side inner ring member 51 and the input-side outer ring member 52 are not illustrated.

As illustrated in FIG. 15, a case is assumed in which a force is applied from the input-side inner ring member 51 to the input-side clutch roller 55. Thus, a magnitude N of force which is directed perpendicularly to the outside tangential line L2 in the outside contact point P2 of the input-side clutch roller 55 and the input-side outer ring member 52 is transmitted from the input-side clutch roller 55 to the input-side outer ring member 52.

At that time, in a direction of the outside tangential line L2, when a force F which is directed from the outside contact point P2 to the opposite side to the intersection point P3 is smaller than a force R which is directed from the outside contact point P2 toward the intersection point P3 (F<R), the input-side clutch roller 55 is maintained to be bitten into the wedge in the wedge-shaped space S. That is, the input-side clutch roller 55 transmits the torque from the input-side inner ring member 51 to the input-side outer ring member 52.

On the contrary, the force F which is directed from the outside contact point P2 to the opposite side to the intersection point P3 is larger than the force R which is directed from the outside contact point P2 toward the intersection point P3 (R<F), the input-side clutch roller 55 slips in the wedge-shaped space S. That is, the input-side clutch roller 55 does not transmit the torque from the input-side inner ring member 51 to the input-side outer ring member 52.

The force F is represented by F=N×tan θ by using the wedge angle θ.

The force R is generated as a counterforce with respect to the force F. The magnitude of the force R is determined according to a static friction coefficient μ0 between the input-side clutch roller 55 and the inner circumferential surface of the input-side outer ring member 52, and is represented by R=N×μ0.

In order that the input-side clutch roller 55 transmits the torque, it is necessary to satisfy an expression of F<R, and an expression of N×tan θ<N×μ0, that is, tan θ<μ0 by using the above expression.

In order that the input-side clutch roller 55 does not transmit the torque, it is necessary to satisfy an expression of R<F, and an expression of N×μ0<N×tan θ, that is, μ0<tan θ by using the above expression.

In the initial position, the input-side clutch roller 55 transmits the torque from the input-side inner ring member 51 to the input-side outer ring member 52.

The initial position indicates a position in which the input-side clutch roller 55 contacts with the input-side inner ring member 51 or the input-side outer ring member 52 in a state where the user does not input the torque to the operation lever 21. When the user inputs the torque to the operation lever 21 from the initial state, the input-side clutch roller 55 is wedge-engaged in the wedge-shaped space S, and thus the input-side inner ring member 51 co-rotates with the input-side outer ring member 52.

The stopper projection 80 is configured such that the wedge engagement of the input-side clutch roller 55 is released so as not to transmit the torque of the input-side inner ring member 51 to the input-side outer ring member 52.

In order to implement such a configuration, the stopper projection 80 is provided at the tip-side position of the wedge-shaped space S from the initial position. When the operation torque input to the operation lever 21 becomes large, the input-side outer ring member 52 is elastically deformed in the radial direction, and the input-side clutch roller 55 moves to the tip side of the wedge-shaped space S.

In the initial position, since it is necessary that the input-side clutch roller 55 transmits the torque, if the wedge angle θ in the initial position is set to θ1, θ1 necessarily satisfies an expression of tan θ1<μ0.

In the stopper projection 80, since the input-side clutch roller 55 does not transmit the torque, if the wedge angle θ in the stopper projection 80 is set to θ2, θ2 necessarily satisfies an expression of μ0<tan θ2.

That is, a relation of the wedge angle θ1 in the initial position, the wedge angle θ2 in the stopper projection 80, and the static friction coefficient μ0 between the input-side clutch roller 55 and the inner circumferential surface of the input-side outer ring member 52 necessarily satisfies an expression of tan θ1<μ0<tan θ2.

Herein, μ0 is changed in various ways according to a material or a surface roughness of the input-side clutch roller 55, a material or a surface roughness of the input-side outer ring member 52, an atmospheric humidity, and the like, and thus it is difficult to specify a preferable numerical range of tan θ1 or tan θ2.

For this reason, in this disclosure, the wedge angle θ2 of the stopper projection 80 is only defined to be larger than the wedge angle θ1 of the initial position. The wedge angle θ2 can be adjusted to an arbitrary angle by adjusting a protruding amount of the stopper projection 80.

When the wedge angle θA (see FIG. 12) of the stopper projection 80 is larger than the wedge angle θ0 (see FIG. 12) of the initial position, the input-side clutch roller 55 in the stopper projection 80 easily slips with respect to the input-side outer ring member 52 compared to the initial position. For this reason, in a case where a large operation torque is input to the operation lever 21, the input-side clutch roller 55 abuts on the stopper projection 80, and the force is hardly transmitted to the input-side outer ring member 52. Accordingly, compared to a case where the stopper projection 80 is not provided, the input-side outer ring member 52 is easily protected in a case where an excessive operation torque is input to the operation lever 21.

Incidentally, when a tangent value of the wedge angle in the stopper projection 80 is set to be two times or more the tangent value of the wedge angle in the initial position, it can be experimentally checked that in the initial position, the input-side clutch roller 55 reliably transmits a force, and in the stopper projection 80, the input-side clutch roller 55 is reliably separated from the input-side outer ring member 52.

Incidentally, in a case where the stopper projection 80 is not provided differently from this disclosure, when an excessive torque is input to the operation lever 21, the excessive magnitude N of force is transmitted from the input-side clutch roller 55 to the input-side outer ring member 52. In a certain rigidity of the input-side outer ring member 52, the input-side outer ring member 52 is plastically deformed by the excessive magnitude N of force.

In this regard, in this disclosure, the stopper projection 80 is provided in a position where the input-side clutch roller 55 moves when the excessive torque is input to the operation lever 21. Accordingly, when the excessive torque is input, the input-side clutch roller 55 is easily separated from the input-side outer ring member 52 or the input-side inner ring member 51 in the stopper projection 80, and the torque is hardly transmitted from the input-side inner ring member 51 to the input-side outer ring member 52. Thus, the input-side outer ring member 52 is hardly deformed plastically.

Incidentally, the above description has given about an example in which a force is transmitted from the input-side inner ring member 51 through the input-side clutch roller 55 to the input-side outer ring member 52, but a case is also similar in which a steering torque input to the operation lever 21 is input to the input-side outer ring member 52, and is transmitted from the input-side outer ring member 52 through the input-side clutch roller 55 to the input-side inner ring member 51. In this case, a static friction coefficient between the input-side clutch roller 55 and the outer circumferential surface of the input-side inner ring member 51 is set as $\mu 0$, and similarly to the above description, it is necessary to satisfy an expression of $\tan \theta 1 < \mu 0 < \tan \theta 2$.

Incidentally, when the stopper projection 80 is provided in the input-side inner ring member 51, it is preferable that the hardness of the input-side clutch roller 55, the hardness of the input-side inner ring member 51, and the hardness of the input-side outer ring member 52 be smaller in such an order.

Otherwise, when the stopper projection 80 is provided in the input-side outer ring member 52, it is preferable that the hardness of the input-side clutch roller 55, the hardness of the input-side outer ring member 52, and the hardness of the input-side inner ring member 51 be smaller in such an order.

Among the input-side clutch roller 55, the input-side inner ring member 51, and the input-side outer ring member 52, the input-side clutch roller 55 is not deformed for transmitting the torque, and is formed in the highest hardness. Next, the hardness of the member (any one of the input-side inner ring member 51 or the input-side outer ring member 52) provided with the stopper projection 80 is small, and when the stopper projection 80 is deformed, the stopper projection 80 hardly functions. Thus, the hardness of the member provided with the stopper projection 80 makes smaller. Furthermore, the hardness of the input-side inner ring member 51 and the hardness of the input-side outer ring member 52 may be made equal to each other.

Incidentally, differently from the above-described embodiment, in a case where the torque input to the operation lever 21 is configured to be transmitted from the input-side outer ring member through the input-side clutch roller to the input-side inner ring member, and to be transmitted to the output-side clutch, the stopper projection 80 may be provided in the input-side outer ring member.

Incidentally, in the above-described embodiment, the description has been given about an example in which the rotation suppressing member 70 is interposed between the release bracket 64 and the input-side outer ring member 52, and this disclosure is not limited thereto.

In addition, the rotation suppressing member 70 may be provided between the housing 11 and the input-side outer ring member 52, and the release bracket 64 may be provided to be adjacent between the input-side outer ring member 52 and the output-side inner ring member 61.

Incidentally, in the above-described embodiment, the description has been given about the vehicle clutch unit 100 including the rotation suppressing member, but this disclosure may be applied also to the vehicle clutch unit which does not include the rotation suppressing member.

What is claimed is:

1. A clutch unit used in a vehicle seat, comprising:
    an operation lever, which is rotatable about a rotational axis line;
    an output shaft member, which is rotatable about the rotational axis line and outputs an operating force that is input to the operation lever to the vehicle seat; and
    an input-side clutch including:
        an input-side inner ring member and an input-side outer ring member, which are provided coaxially with the rotational axis line and in which the output shaft member is inserted; and
        an input-side transmission member, which is arranged in a wedge-shaped space formed between an outer circumferential surface of the input-side inner ring member and an inner circumferential surface of the input-side outer ring member,
    wherein the input-side clutch transmits, through the input-side transmission member, a rotation of the operation lever to the output shaft member in such a manner that one member of the input-side inner ring member and the input-side outer ring member rotates according to the rotation of the operation lever to rotate the other member of the input-side inner ring member and the input-side outer ring member,
    wherein the input-side transmission member is provided to move from an initial position toward a tip of the wedge-shaped space when an operation torque input to the operation lever is equal to or more than a predetermined torque, and
    wherein as viewed in the rotational axis line direction,
        an inside tangential line is a tangential line at a contact point of the input-side transmission member and the input-side inner ring member,
        an outside tangential line is a tangential line at a contact point of the input-side transmission member and the input-side outer ring member, and
        a segment connects a rotational center of the input-side transmission member with an intersection point between the inside tangential line and the outside tangential line,
    wherein a wedge angle is an acute angle defined by the segment and the inside tangential line, and
    wherein a stopper projection is provided at a tip-side position of the wedge-shaped space from the initial position, and a wedge angle formed by the stopper projection is larger than an initial wedge angle at the initial position,
    wherein the stopper projection protrudes toward the wedge-shaped space from at least one of the outer circumferential surface of the input-side inner ring member and the inner circumferential surface of the input-side outer ring member, and
    wherein the stopper projection is provided to release a wedge engagement of the input-side transmission member.

2. The vehicle clutch unit according to claim 1,
    wherein the stopper projection is provided in one of the input-side inner ring member and the input-side outer ring member, and
    wherein a hardness value of the input-side transmission member, a hardness value of one of the input-side inner ring member and the input-side outer ring member provided with the stopper projection, and a hardness value of the other of the input-side inner ring member and the input-side outer ring member not provided with the stopper projection are smaller in such an order.

3. The vehicle clutch unit according to claim 1, wherein the wedge-shaped spaces are shaped to be tapered in a counterclockwise direction.

4. The vehicle clutch unit according to claim 1, wherein the stopper projection is configured such that the wedge engagement of the input-side clutch is released so as not to transmit the operation torque of the input-side inner ring member to the input-side outer ring member.

5. The vehicle clutch unit according to claim 1, wherein, in the initial position, the wedge angle in the initial position is set to $\theta 1$ and a static friction coefficient between the input-side clutch and the inner circumferential surface of the input-side outer ring member set to $\mu 0$, $\theta 1$ satisfies an expression of $\tan \theta 1 < \theta 1$.

6. The vehicle clutch unit according to claim 5, wherein the wedge angle in the stopper projection is set to $\theta 2$, $\theta 2$ satisfies an expression of $\mu 0 < \tan \theta 2$.

7. The vehicle clutch unit according to claim 6, wherein the wedge angle of the stopper projection $\theta 2$ is greater than the wedge angle $\theta 1$ of the initial position.

8. The vehicle clutch unit according to claim 1, wherein the wedge angle in the stopper projection is set to $\theta 2$ and a static friction coefficient between the input-side clutch and the inner circumferential surface of the input-side outer ring member set to $\mu 1$, $\theta 2$ satisfies an expression of $\mu 0 < \tan \theta 2$.

* * * * *